US012592120B2

(12) United States Patent
Sawyer et al.

(10) Patent No.: US 12,592,120 B2
(45) Date of Patent: Mar. 31, 2026

(54) SLOT MACHINE DATA AND RECOMMENDATIONS

(71) Applicant: Slotco, LLC, Onamia, MN (US)

(72) Inventors: Robert Allen Sawyer, Brainerd, MN (US); Joseph Peter Stefaniak, San Clemente, CA (US)

(73) Assignee: SLOTCO, LLC, Onamia, MN (US)

( * ) Notice: Subject to any disclaimer, the term of this patent is extended or adjusted under 35 U.S.C. 154(b) by 341 days.

(21) Appl. No.: 18/322,998

(22) Filed: May 24, 2023

(65) Prior Publication Data

US 2023/0386292 A1 Nov. 30, 2023

Related U.S. Application Data

(60) Provisional application No. 63/347,061, filed on May 31, 2022.

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.
CPC ...... *G07F 17/3234* (2013.01); *G07F 17/3223* (2013.01)

(58) Field of Classification Search
CPC ... G07F 17/32; G07F 17/3214; G07F 17/3222
USPC ........................ 463/1, 20, 22, 30, 39, 40, 42
See application file for complete search history.

(56) References Cited

U.S. PATENT DOCUMENTS

| | | | | |
|---|---|---|---|---|
| 2012/0123567 | A1* | 5/2012 | Nayak | G07F 17/3223 700/91 |
| 2016/0163158 | A1* | 6/2016 | Arnone | G07F 17/3225 463/25 |
| 2022/0245530 | A1* | 8/2022 | Bathe | G06Q 10/1093 |
| 2023/0222537 | A1* | 7/2023 | Inamdar | G06Q 30/0243 705/14.43 |
| 2025/0157289 | A1* | 5/2025 | Wolfe | G07F 17/3239 |

* cited by examiner

*Primary Examiner* — Adetokunbo O Torimiro
(74) *Attorney, Agent, or Firm* — Fredrikson & Byron, P.A.

(57) ABSTRACT

A method includes the steps of receiving, from a first casino, first casino slot machine data on a per-spin basis from at least one slot machine at the first casino, receiving, from a second casino, second casino slot machine data on a per-spin basis from at least one slot machine at the second casino, comparing the first and second casino slot machine data to at least one predetermined threshold, based at least on comparing the first casino slot machine data to the at least one predetermined threshold outputting a first recommendation to the first casino, and based at least on comparing the second casino slot machine data to the at least one predetermined threshold outputting a second recommendation to the second casino.

19 Claims, 6 Drawing Sheets

SLOT MACHINE DATA AND RECOMMENDATIONS

RELATED APPLICATION

This application claims priority to U.S. provisional patent application No. 63/347,061, filed on May 31, 2022, the entire contents of which are hereby incorporated by reference.

TECHNICAL FIELD

The disclosure relates to transmission and reception of slot machine data in a network, for instance, networks used in casino operations and, more particularly, the use of transmitted slot machine data to determine one or more outputs based on the slot machine data. In various embodiments disclosed herein, the slot machine data includes slot machine data on a per-spin basis, and, in such various embodiments, this per-spin slot machine data is used to determine one or more outputs based on the per-spin slot machine data. For example, in various such embodiments disclosed herein, a system is provided that integrates this per-spin slot machine data to allow for novel tracking of slot machines in a substantially real-time manner.

BACKGROUND

Casinos offer various types of gaming assets to customers. One such type of gaming asset is a slot machine. A slot machine accepts payment from a customer in exchange for a spin at the slot machine. Depending on the parameters of the game offered by the slot machine and the outcome of the spin, the customer may win a defined payment or lose the provided payment.

The ability of casino operators to improve customer experience and optimize operational efficiency has generally been limited due to lack of useful slot machine-related data. In particular, two issues contribute significantly to this lack of useful slot machine-related data. First, a casino operator is typically limited to slot machine-related data on an infrequent, periodic basis, such as once every several months. And, second, the slot machine-related data a casino operator does receive (albeit infrequently) is typically too generic and abstract to derive meaningful insights from, as this current slot machine-related data is at a high-level, compilation of total slot machine receipts and payouts provided as aggregate numbers over a period of months. Thus, because the slot machine-related data casino operators currently receive is usually too outdated and too generic, this current slot machine-related data significantly hampers the ability of a casino operator to determine meaningful, precise actions that can be taken to improve customer experience and casino operator operational efficiency.

SUMMARY

In general, this disclosure relates to systems, devices, and methods for transmission and reception of slot machine data in a network, such as a network connecting one or more casinos and one or more remote computing devices, such as a remote server. This disclosure also relates to systems, devices, and methods for determining one or more outputs based on the received slot machine data, which can include slot machine data on a per-spin basis.

Embodiments described herein can improve an ability to determine meaningful, precise output actions that can be taken, for instance, to improve customer experience and casino operational efficiency. In particular, various such embodiments described herein can utilize slot machine data that includes slot machine data on a per-spin basis, and, in such various embodiments, this per-spin slot machine data is used as a basis to determine one or more outputs. Notably, the transmission and utilization of per-spin slot machine data can allow for timely and precise insights to be derived and leveraged to cause meaningful improvements in customer experience and casino operator operational efficiency. In many instances, the transmission and utilization of per-spin slot machine data can allow for insights to be derived and leveraged that otherwise would not have been possible based on prior systems and techniques that infrequently (e.g., monthly, quarterly, etc.) transmitted aggregate, non-per-spin basis data that is more generic, abstract, and high-level (e.g., compilation of total slot machine receipts and payouts provided as aggregate numbers over a period of months) than the per-spin slot machine data transmitted and utilized by embodiments disclosed herein. Accordingly, embodiments disclosed herein can solve problems associated with prior systems, which merely transmitted outdated and generic data slot machine data, to allow for the determination of one or more outputs that can more precisely target newly derived insights that would not have been possible to derive using the outdated and generic data slot machine data of prior systems.

One embodiment includes a method comprising the step of receiving, from a slot machine, slot machine data, with the slot machine data including data on a per-spin basis at the slot machine. This method embodiment further includes the steps of comparing the slot machine data to at least one predetermined threshold, and, when the slot machine data satisfies the at least one predetermined threshold, outputting a notification to a remote device.

In a further embodiment of this method, the at least one predetermined threshold relates to a slot machine metric on a per-spin basis.

In a further embodiment of this method, the slot machine data on a per-spin basis at the slot machine includes one or more of: slot machine game data; slot machine player data; and slot machine maintenance data. As one such example, the slot machine data on a per-spin basis at the slot machine includes each of slot machine game data, slot machine player data, and slot machine maintenance data. In some such embodiments, the method can further include the steps of: when the received slot machine data comprises slot machine game data, determining that the notification is to be output to a first remote device based on the first remote device being associated with slot machine game data in a contact correspondence table; and when the received slot machine data comprises slot machine maintenance data, determining that the notification is to be output to a second remote device (e.g., different than the first remote device) based on the second remote device being associated with slot machine maintenance data in a contact correspondence table. The slot machine game data can include, for example, one or more of: a time when a spin occurs at the slot machine; an amount and a type of a payment by a player to the slot machine; an amount and a type of a payment by the slot machine to the player; a loss of a game resulting from a spin at the slot machine; a number of credits lost at the slot machine resulting from a spin at the slot machine; a win of a game resulting from a spin at the slot machine; a number of credits won at the slot machine resulting from a spin at the slot machine; a number of games played at the slot machine; a number of games played at the slot machine since an access door at the slot machine was closed; and an average theoretical payback percentage associated with the spin at the slot machine. The slot machine player data can include, for example, one or more of: a player identification number; a number of games lost by a player at the slot machine; a number of credits lost by a player at the slot machine resulting from a spin at the slot machine; a number of games won by a player at the slot machine; a number of credits won by a player at the slot machine resulting from a spin at the slot machine; a player transfer between cash and credits; and a total number of slot machine credits held by a player. The slot machine maintenance data can include, for example, one or more of: a slot machine identification corresponding to the slot machine; a number of currency bills currently held in the slot machine; a total monetary value of currency bills currently held in the slot machine; an inoperable game at the slot machine; a type of malfunctioning peripheral device at the slot machine; a temperature at the slot machine; and a back-up battery event at the slot machine.

In a further embodiment of this method, the slot machine data on a per-spin basis at the slot machine includes each of a win or loss of a game by an identified player resulting from a spin at the slot machine, a number of credits won or lost at the slot machine by an identified player resulting from a spin at the slot machine, and an inoperable game at the slot machine.

In a further embodiment of this method, the slot machine is a first slot machine at a first casino, and the method further includes the steps of: receiving, from a second slot machine at a second casino that is remote from the first casino, second slot machine data, where the second slot machine data includes data on a per-spin basis at the second slot machine; comparing the second slot machine data to at least one predetermined threshold; and, when the second slot machine data satisfies the at least one predetermined threshold, outputting a second notification to a remote device. In a further yet embodiment of this method, this method can additionally include the step of: comparing the slot machine data on a per-spin basis at the first slot machine to the second slot machine data on a per-spin basis at the second slot machine.

In a further embodiment of this method, this method can also include the steps of transmitting the slot machine data on a per-spin basis at the slot machine from the slot machine to an on-site casino computing device; and transmitting the slot machine data on a per-spin basis at the slot machine from the on-site casino computing device to a remote server, where the remote server compares the slot machine data to the at least one predetermined threshold and, when the slot machine data satisfies the at least one predetermined threshold, the remote server outputs the notification to the remote device. Such an embodiment can additionally include the step of after transmitting the slot machine data on a per-spin basis at the slot machine from the on-site casino computing device to the remote server, transmitting a control command from the remote server to the slot machine. For example, the control command from the remote server to the slot machine can include a command to cause the slot machine to transition from an operable state to an inoperable state.

Another embodiment includes a device. This device embodiment includes a storage component, a communication unit, and programmable processing circuitry. The storage component is configured to store a slot machine data analysis model. The communication unit is configured to receive, from a slot machine, slot machine data, where the slot machine data includes data on a per-spin basis at the slot machine. The programmable processing circuitry is configured to execute the slot machine data analysis model to: compare the slot machine data to at least one predetermined threshold; and, when the slot machine data satisfies the at least one predetermined threshold, output a notification to a remote device.

In a further embodiment of this device, the at least one predetermined threshold relates to a slot machine metric on a per-spin basis. And, the slot machine data on a per-spin basis at the slot machine includes one or more of: slot machine game data; slot machine player data; and slot machine maintenance data. For example, the slot machine game data can include one or more of: a time when a spin occurs at the slot machine; an amount and a type of a payment by a player to the slot machine; an amount and a type of a payment by the slot machine to the player; a loss of a game resulting from a spin at the slot machine; a number of credits lost at the slot machine resulting from a spin at the slot machine; a win of a game resulting from a spin at the slot machine; a number of credits won at the slot machine resulting from a spin at the slot machine; a number of games played at the slot machine; a number of games played at the slot machine since an access door at the slot machine was closed; and an average theoretical payback percentage associated with the spin at the slot machine. As another example, the slot machine player data can include one or more of a player identification number; a number of games lost by a player at the slot machine; a number of credits lost by a player at the slot machine resulting from a spin at the slot machine; a number of games won by a player at the slot machine; a number of credits won by a player at the slot machine resulting from a spin at the slot machine; a player transfer between cash and credits; and a total number of slot machine credits held by a player. And, as a further example, the slot machine maintenance data can include one or more of a slot machine identification corresponding to the slot machine; a number of currency bills currently held in the slot machine; a total monetary value of currency bills currently held in the slot machine; an inoperable game at the slot machine; a type of malfunctioning peripheral device at the slot machine; a temperature at the slot machine; and a back-up battery event at the slot machine.

Another embodiment includes a method. This method embodiment receiving, from a first casino, first casino slot machine data, where the first casino slot machine data includes data on a per-spin basis from at least one slot machine at the first casino; receiving, from a second casino, second casino slot machine data, where the second casino slot machine data includes data on a per-spin basis from at least one slot machine at the second casino, the second casino being a different casino located at a different location than the first casino; comparing the first casino slot machine data, including the data on the per-spin basis from the at least one slot machine at the first casino, to at least one predetermined threshold; comparing the second casino slot machine data, including the data on the per-spin basis from the at least one slot machine at the second casino, to at least one predetermined threshold; based at least on comparing the first casino slot machine data to the at least one predetermined threshold, outputting a first recommendation to the first casino; and based at least on comparing the second casino slot machine data to the at least one predetermined threshold, outputting a second recommendation to the second casino.

In a further embodiment of this method, the at least one predetermined threshold relates to a slot machine metric on a per-spin basis.

In a further embodiment of this method, the at least one slot machine at the first casino includes a first slot machine at the first casino, and the first casino slot machine data comprises first slot machine game data that comprises a number of credits played for a spin at the first slot machine and a number of credits won/lost resulting from the spin at the first slot machine at the first casino. And, the at least one slot machine at the second casino includes a second, different slot machine at the second casino, and the second casino slot machine data includes second slot machine game data that includes a number of credits played for a spin at the second slot machine and a number of credits won/lost resulting from the spin at the second slot machine at the second casino.

In one such exemplary method embodiment, the at least one predetermined threshold includes a predetermined risk/reward player disposition threshold. Comparing the first casino slot machine data, including the data on the per-spin basis from the at least one slot machine at the first casino, to at least one predetermined threshold includes comparing the number of credits played for the spin at the first slot machine and the number of credits won/lost resulting from the spin at the first slot machine at the first casino to the predetermined risk/reward player disposition threshold. And comparing the second casino slot machine data, including the data on the per-spin basis from the at least one slot machine at the second casino, to at least one predetermined threshold includes comparing the number of credits played for the spin at the second slot machine and the number of credits won/lost resulting from the spin at the second slot machine at the second casino to the predetermined risk/reward player disposition threshold.

In a further such exemplary method embodiment, the predetermined risk/reward player disposition threshold includes a predetermined number of credits played per-spin threshold. Comparing the first casino slot machine data, including the data on the per-spin basis from the at least one slot machine at the first casino, to at least one predetermined threshold includes comparing the number of credits played for the spin at the first slot machine at the first casino to the predetermined number of credits played per-spin threshold. And outputting the first recommendation to the first casino based at least on comparing the first casino slot machine data to the at least one predetermined threshold includes outputting a first risk/reward configuration adjustment recommendation for the first slot machine at the first casino based at least on comparing the number of credits played for the spin at the first slot machine at the first casino to the predetermined number of credits played per-spin threshold. For instance, in this such embodiment, the number of credits played for the spin at the first slot machine at the first casino can be below the predetermined number of credits played per-spin threshold, and the output first risk/reward configuration adjustment recommendation for the first slot machine at the first casino can include a recommendation to decrease a risk/reward configuration of the first slot machine. Likewise, comparing the second casino slot machine data, including the data on the per-spin basis from the at least one slot machine at the second casino, to at least one predetermined threshold includes comparing the number of credits played for the spin at the second slot machine at the second casino to the predetermined number of credits played per-spin threshold. And outputting the second recommendation to the second casino based at least on comparing the second casino slot machine data to the at least one predetermined threshold includes outputting a second risk/reward configuration adjustment recommendation for the second slot machine at the second casino based at least on comparing the number of credits played for the spin at the second slot machine at the second casino to the predetermined number of credits played per-spin threshold. For instance, in this such embodiment, the number of credits played for the spin at the second slot machine at the second casino can be above the predetermined number of credits played per-spin threshold, and the output second risk/reward configuration adjustment recommendation for the second slot machine at the second casino can include a recommendation to increase a risk/reward configuration of the second slot machine.

In a further embodiment of this method, the at least one slot machine at the first casino includes a first slot machine at the first casino, and the first casino slot machine data includes first slot machine per-spin game data. The at least one slot machine at the second casino includes a second slot machine at the second casino, and the second casino slot machine data includes second slot machine per-spin game data. The at least one predetermined threshold includes a predetermined risk/reward player disposition threshold. Based at least on comparing the first slot machine per-spin game data to the predetermined risk/reward player disposition threshold, the method embodiment includes outputting to the first casino the first recommendation that includes recommending a decrease to a risk/reward configuration of the first slot machine. And based at least on comparing the second slot machine per-spin game data to the predetermined risk/reward player disposition threshold, the method embodiment includes outputting to the second casino the second recommendation that includes recommending an increase to a risk/reward configuration of the second slot machine.

In a further embodiment of this method, the at least one slot machine at the first casino is a first plurality of slot machines at the first casino, and the first casino slot machine data includes data on the per-spin basis from each of the first plurality of slot machines at the first casino. In such embodiment, the method can further include using the first casino slot machine data on the per-spin basis from each of the first plurality of slot machines at the first casino to create a first casino standardized volatility scale that represents at least one of (i) a deviation in slot machine game win magnitude across the first plurality of slot machines at the first casino and (ii) a deviation in slot machine game win frequency across the first plurality of slot machines at the first casino. Based at least on comparing the first casino standardized volatility scale to the at least one predetermined threshold, this method embodiment can include outputting to the first casino the first recommendation that includes a recommendation to install at the first casino a particular type of slot machine that will, when installed at the first casino, adjust the first casino standardized volatility scale by a first degree of volatility. Similarly, in a yet further embodiment of this method, the at least one slot machine at the second casino is a second plurality of slot machines at the second casino, and the second casino slot machine data includes data on the per-spin basis from each of the second plurality of slot machines at the second casino. In such embodiment, the method can further include using the second casino slot machine data on the per-spin basis from each of the second plurality of slot machines at the second casino to create a second casino standardized volatility scale that represents at least one of: (i) a deviation in slot machine game win magnitude across the second plurality of slot machines at the second casino and (ii) a deviation in slot machine game win frequency across the second plurality of slot machines at the second casino. Based at least on comparing the second casino standardized volatility scale to the at least one predetermined threshold, this method embodiment can include outputting to the second casino the second recommendation that includes a recommendation to install at the second casino a particular type of slot machine that will, when installed at the second casino, adjust the second casino standardized volatility scale by a second degree of volatility.

In a still further embodiment of this method, the first plurality of slot machines at the first casino and the second plurality of slot machines at the second casino can include slot machines from different manufacturers. In such instances, the method can further include using the first casino slot machine data that includes data on the per-spin basis from each of the first plurality of slot machines at the first casino and the second casino slot machine data that includes data on the per-spin basis from each of the second plurality of slot machines at the second casino to create a cross-manufacturer slot machine standardized volatility scale that represents at least one of: (i) a deviation in slot machine game win magnitude across the first plurality of slot machines at the first casino and the second plurality of slot machines at the second casino that include slot machines from different manufacturers and (ii) a deviation in slot machine game win frequency across the first plurality of slot machines at the first casino and the second plurality of slot machines at the second casino that include slot machines from different manufacturers. For example, the predetermined threshold can include the cross-manufacturer slot machine standardized volatility scale, the first recommendation can be output to the first casino based at least in part on the cross-manufacturer slot machine standardized volatility scale, and the second recommendation can be output to the second casino based at least in part on the cross-manufacturer slot machine standardized volatility scale. This can include, based on the cross-manufacturer slot machine standardized volatility scale, the first recommendation output to the first casino including a first casino recommendation to replace a first type of slot machine at the first casino with a different type of slot machine that has a first different risk/reward game configuration, and based on the cross-manufacturer slot machine standardized volatility scale, the second recommendation output to the second casino including a second casino recommendation to replace a second type of slot machine at the second casino with a different type of slot machine that has a second different risk/reward game configuration.

In a further embodiment of this method, the first casino slot machine data that includes data on a per-spin basis from at least one slot machine at the first casino includes one or more of: first slot machine game data, first slot machine first player data, and first slot machine maintenance data. And the second casino slot machine data that includes data on a per-spin basis from at least one slot machine at the second casino includes one or more of second slot machine game data, second slot machine first player data, and second slot machine maintenance data. In this embodiment, the first casino slot machine data including data on a per-spin basis from at least one slot machine at the first casino can include each of: first slot machine game data, first slot machine first player data, and first slot machine maintenance data. And the second casino slot machine data that includes data on a per-spin basis from at least one slot machine at the second casino can include each of: second slot machine game data, second slot machine first player data, and second slot machine maintenance data. For instance, the first slot machine game data can include: a time when a spin occurs at the first slot machine; a win/loss result of a first game resulting from a first spin at the first slot machine; a number of credits won/lost at the first slot machine resulting from the first spin at the first slot machine; and a number of games played at the first slot machine. And the second slot machine game data can include: a time when a spin occurs at the second slot machine; a win/loss result of a second game resulting from a second spin at the second slot machine; a number of credits won/lost at the second slot machine resulting from the second spin at the second slot machine; and a number of games played at the second slot machine. The first slot machine maintenance data can include one or more of: a number of currency bills currently held in the first slot machine; a total monetary value of currency bills currently held in the first slot machine; a type of malfunctioning peripheral device at the first slot machine; and a temperature at the first slot machine. The second slot machine maintenance data can include one or more of: a number of currency bills currently held in the second slot machine; a total monetary value of currency bills currently held in the second slot machine; a type of malfunctioning peripheral device at the second slot machine; and a temperature at the second slot machine.

In a further embodiment of this method, the method can additionally include, after comparing the first casino slot machine data to the at least one predetermined threshold, transmitting a first control command from a remote server to the first slot machine at the first casino, where the first control command comprises a first command to cause the first slot machine to transition from an operable state to an inoperable state.

And, in a yet further embodiment of this method, the method can additionally include, after comparing the second casino slot machine data to the at least one predetermined threshold, transmitting a second control command from the remote server to the second slot machine at the second casino, where the second control command comprises a second command to cause the second slot machine to transition from an operable state to an inoperable state.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

The following drawings are illustrative of particular examples of the present invention and therefore do not limit the scope of the invention. The drawings are not necessarily to scale, though embodiments can include the scale illustrated, and are intended for use in conjunction with the explanations in the following detailed description wherein like reference characters denote like elements. Examples of the present invention will hereinafter be described in conjunction with the appended drawings.

DETAILED DESCRIPTION

The following detailed description is exemplary in nature and is not intended to limit the scope, applicability, or configuration of the invention in any way. Rather, the following description provides some practical illustrations for implementing examples of the present invention. Those skilled in the art will recognize that many of the noted examples have a variety of suitable alternatives.

In accordance with the features and techniques of the disclosure, a device can receive per-spin slot machine data from a slot machine. The device can compare this received slot machine data to one or more predetermined thresholds (e.g., a predetermined slot machine metric on a per-spin basis) and, based on this comparison, determine an output. In various embodiments within the scope of the present disclose, the output can include a notification to a remote user device, such as a remote user computing device, corresponding to a contact stored at a database at the device that receives the slot machine data in association with the satisfied predetermined threshold.

Figure 1:
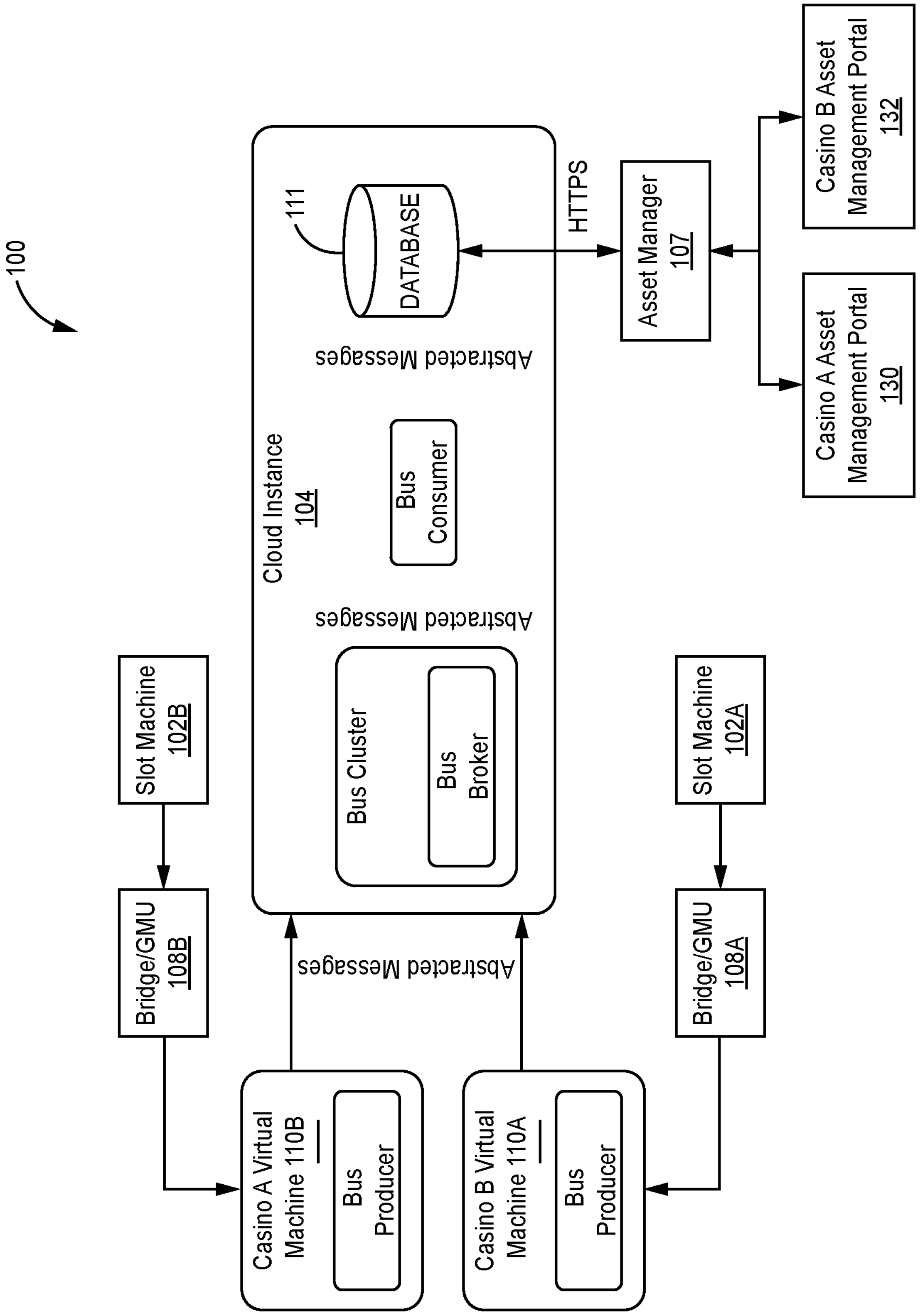
FIG. 1 is a conceptual block diagram illustrating an embodiment of a system for transmitting and accessing slot machine data on a per-spin basis, in accordance with some examples of this disclosure.

FIG. 1 illustrates an embodiment of a system 100 for transmitting and accessing slot machine data on a per-spin basis. The system 100 can include one or more slot machines 102A, 102B and a remote server 104. The one or more slot machines 102A, 102B can transmit slot machine data to the remote server 104, and the remote server 104 can store and/or use the received slot machine data from the one or more slot machines 102A, 102B to determine an output, such as a notification output to one or more remote devices (e.g., remote device 106 shown at FIG. 2).

As will be described further herein, the system 100 can also include an asset manager module 107. The asset manager module 107 can be included, and executed, at the remote server 104 or the asset manager module 107 can be included, and executed, at another component of the system 100 remote from the slot machines 102A, 102B. In any case, the asset manager module 107 can be in data communication with the slot machine data (e.g., per-spin slot machine data) transmitted from the one or more slot machines 102A, 102B. For instance, the remote server 104 can receive and store thereat per-spin slot machine data from the slot machines 102A, 102B, and the asset manager module 107 can access and analyze this per-spin slot machine stored at the remote server 104. As detailed further herein, the asset manager module 107 compare the slot machine data (e.g., per-spin slot machine data) to one or more predetermined thresholds and based on such comparison(s) provide an output recommendation to one or more casinos.

Asset manager module 107 can use the per-spin slot machine data to derive one or more slot machine recommendations for one or more casinos.

As one example, different casinos at different regional locations can tend to have different player behavior with respect to slot machines at the particular casino location. For instance, a first casino ("Casino A") at a first location may tend to have player behavior in general that is disproportionately skewed toward a relatively low risk/reward player disposition (e.g., tending to play slot machines at a relatively low risk/reward configuration such that a relatively lower number of credits are played in exchange for a relatively lower number of potential credits to be won), while a second casino ("Casino B") at a second, different location may tend to have player behavior in general that is disproportionately skewed toward a relatively high risk/reward player disposition (e.g., tending to play slot machines at a relatively high risk/reward configuration such that a relatively higher number of credits are played in exchange for a relatively higher number of potential credits to be won). In such an example, an embodiment of the asset manager module 107 can be configured to use per-spin slot machine data to ascertain a risk/reward player disposition at a particular casino and then use that ascertained risk/reward player disposition to output one or more recommendations to that particular casino relating to one or more adjustment to that particular casino's risk/reward configuration based on the ascertained risk/reward player disposition such that that particular casino's slot machines can be adjusted to better match the ascertained risk/reward player disposition. This could include, for the first casino ("Casino A"), the asset manager module 107 using the per-spin slot machine data to ascertain that the first casino player behavior in general is disproportionately skewed toward a relatively lower risk/reward player disposition because the per-spin slot machine data indicates that first casino players are currently playing slot machines at a relatively low risk/reward configuration such that a relatively lower number of credits are played in exchange for a relatively lower number of potential credits to be won, while, for the second casino ("Casino B"), this could include the asset manager module 107 using the per-spin slot machine data to ascertain that the second casino player behavior in general is disproportionately skewed toward a relatively higher risk/reward player disposition because the per-spin slot machine data indicates that second casino players are currently playing slot machines at a relatively high risk/reward configuration such that a relatively higher number of credits are played in exchange for a relatively higher number of potential credits to be won. The asset manager module 107 can thus provide a first recommendation to the first casino to adjust the configuration of one or more slot machines at the first casino to lower the risk/reward configuration of such one or more slot machines (e.g., decreasing the number of credits required for a spin and/or decreasing the number of potential credits to be won for a spin) at the first casino to better suit the disproportionate relatively lower risk/reward player disposition at the first casino, while the asset manager module 107 can thus provide a second, different recommendation to the second, different casino to adjust the configuration of one or more slot machines at the second casino to increase the risk/reward configuration of such one or more slot machines (e.g., increasing the number of credits required for a spin and/or increasing the number of potential credits to be won for a spin) at the second casino to better suit the disproportionate relatively higher risk/reward player disposition at the second casino.

As another example with respect to the asset manager module 107, slot machines located at a particular casino can have different degrees of volatility across different slot machines, for instance, meaning that the different degrees of volatility can result in the slot machines having differences in a magnitude of spin win events and a frequency of such spin win events. This can be especially true for slot machines made by different slot machine manufacturers. For instance, a first plurality of slot machines that are in the same game configuration and manufactured by a first manufacturer and located at the first casino can have a first standardized volatility scale (e.g., as ascertained by the asset manager module 107), while a second plurality of slot machines that are in the same game configuration and manufactured by a second, different manufacturer and located at the second casino can have a second standardized volatility scale (e.g., as ascertained by the asset manager module 107). And the same can be true, for instance, at a second casino at a second different location. Accordingly, the asset manager module 107 can be configured to use the per-spin slot machine data from the first casino and the second, differently located casino to create a cross-manufacturer slot machine standardized volatility scale for a set of slot machines made by different slot machine manufacturers.

As yet another example with respect to the asset manager module 107, slot machine asset management providers can execute the asset manager module 107 using the per-spin slot machine data to make invoices available to casino owner clients with substantially real-time data (e.g., including slot machine data that occurred within the past 60 minutes, within the past 30 minutes, within the past 10 minutes, within the past one minute). The asset manager module 107 can be configured to use the per-spin slot machine data from slot machines located at the first casino to ascertain an amount of revenue the first casino owner client has made, or lost as the case may be, on a selected slot machine, or selected group(s) of slot machines, at the first casino in substantially real-time data (e.g., including slot machine data that occurred within the past 60 minutes, within the past 30 minutes, within the past 10 minutes, within the past one minute). Likewise, the asset manager module 107 can be configured to use the per-spin slot machine data from slot machines located at the second casino to ascertain an amount of revenue the second casino owner client has made, or lost as the case may be, on a selected slot machine, or selected group(s) of slot machines, at the second casino in substantially real-time data (e.g., including slot machine data that occurred within the past 60 minutes, within the past 30 minutes, within the past 10 minutes, within the past one minute).

Slot machines 102A, 102B can be configured to offer one or more games. A customer can provide a payment at one of the slot machines 102A, 102B and in exchange receive a defined number of "spins" at the one of the slot machines 102A, 102B. A single spin can correspond to a single play of a game at the one of the slot machines 102A, 102B. The result of the single spin at the one of the slot machines 102A, 102B can be a win of a game resulting from the spin and reception of a defined number of credits corresponding to the type of win or a loss of a game resulting from the spin and loss of a defined number of credits corresponding to the number of credits played on that spin.

Each of slot machine 102A and slot machine 102B can be configured to generate slot machine data on a per-spin basis at that slot machine 102A, 102B. Slot machines 102A, 102B can generate this slot machine data on a per-spin basis relating to various data points from when a customer initially engages the slot machine 102A, 102B to play a spin to when the result of that particular spin occurs. Each of slot machines 102A, 102B can then periodically transmit the generated slot machine data on a per-spin basis to the remote server 104. For example, slot machines 102A, 102B can transmit the generated slot machine data on a per-spin basis at predefined times and/or on the occurrence of predefined event(s) at the slot machine 102A, 102B. As one example, slot machines 102A, 102B can transmit the generated slot machine data on a per-spin basis at predefined times, such as upon the occurrence of a result of a spin at that slot machine, upon the occurrence of a predefined number of spins at that slot machine, once every minute, once every hour, or once every day.

Slot machine data generated on a per-spin basis at the respective slot machine 102A, 102B can include various types of data. For example, slot machine data on a per-spin basis at the respective slot machine 102A, 102B can include one or more of: slot machine game data, slot machine player data, and slot machine maintenance data. In one such example, slot machine data on a per-spin basis at the respective slot machine 102A, 102B can include each of slot machine game data, slot machine player data, and slot machine maintenance data.

In some embodiments, slot machine game data can include one or more of a time when a spin occurs at the slot machine; an amount and a type of a payment by a player to the slot machine; an amount and a type of a payment by the slot machine to the player; a loss of a game resulting from a spin at the slot machine; a number of credits lost at the slot machine resulting from a spin at the slot machine; a win of a game resulting from a spin at the slot machine; a number of credits won at the slot machine resulting from a spin at the slot machine; a number of games played at the slot machine; a number of games played at the slot machine since an access door at the slot machine was closed; and an average theoretical payback percentage associated with the spin at the slot machine. In one such example embodiment, the slot machine gaming data can include each of a win/loss of a game resulting from a spin at the slot machine; a number of credits won/lost at the slot machine resulting from a spin at the slot machine; and a number of games played at the slot machine.

In some embodiments, slot machine player data can include one or more of a player identification number; a number of games lost by a player at the slot machine; a number of credits lost by a player at the slot machine resulting from a spin at the slot machine; a number of games won by a player at the slot machine; a number of credits won by a player at the slot machine resulting from a spin at the slot machine; a player transfer between cash and credits; and a total number of slot machine credits held by a player. In one such example embodiment, the slot machine player data can include each of a player identification number; a number of games won/lost by a player at the slot machine; and a number of credits won/lost by a player at the slot machine resulting from a spin at the slot machine.

And, in some embodiments, slot machine maintenance data can include one or more of: a slot machine identification corresponding to the slot machine; a number of currency bills currently held in the slot machine; a total monetary value of currency bills currently held in the slot machine; an inoperable game at the slot machine; a type of malfunctioning peripheral device at the slot machine; a temperature at the slot machine; and a back-up battery event at the slot machine. In one such example embodiment, the slot machine maintenance data can include each of a slot machine identification corresponding to the slot machine;

and at least one of an inoperable game at the slot machine and a type of malfunctioning peripheral device at the slot machine.

As noted, in some examples, the slot machine data on a per-spin basis at the slot machine 102A, 102B can include two or more of slot machine game data, slot machine player data, and slot machine maintenance data. In some such examples, the slot machine data on a per-spin basis at the slot machine 102A, 102B can include each of slot machine game data, slot machine player data, and slot machine maintenance data. For instance, the slot machine data on a per-spin basis at the slot machine 102A, 102B can include each of a win or loss of a game by an identified player resulting from a spin at the slot machine, a number of credits won or lost at the slot machine by an identified player resulting from a spin at the slot machine, and an inoperable game at the slot machine. Such slot machine data on a per-spin basis at the slot machine 102A, 102B thus includes a combination of slot machine game data, slot machine player data, and slot machine maintenance data, and further includes an association of certain slot machine game data with certain slot machine player data (e.g., a win or loss of a game by an identified player resulting from a spin at the slot machine; a number of credits won or lost at the slot machine by an identified player resulting from a spin at the slot machine).

To execute the transmission of slot machine data, slot machine 102A can include a transmitter 108A and slot machine 102B can include a transmitter 108B. Transmitter 108A can be configured to send slot machine data from the slot machine 102A to remote server 104 and transmitter 108B can be configured to send slot machine data from the slot machine 102B to remote server 104. In one embodiment, the transmitters 108A, 108B can be configured to send the slot machine data from the respective slot machine 102A, 102B as one or more data packets according to a defined protocol. For instance, the transmitters 108A, 108B can be configured to send the slot machine data from the respective slot machine 102A, 102B as one or more data packets according to a protocol defined as Slot Accounting System Serial Communication Protocol (oftentimes referred to as "SAS" or "SAS v6" when referring to version 6 of this defined protocol). In other instances, one or more other protocols can be used to transmit the slot machine data (e.g., the slot machine data on a per-spin basis) from the slot machines 102A, 102B.

In the illustrated embodiment of FIG. 1, slot machine 102A can include a first game monitoring processing unit (GMU) coupled to transmitter 108A and slot machine 102B can include a second game monitoring processing unit (GMU) coupled to transmitter 108B. The first GMU at the slot machine 102A and the second GMU at the slot machine 102B can each be configured to receive slot machine game data (e.g., from a central processing control circuitry of the respective slot machine 102A, 102B), slot machine player data (e.g., from a player information input device (e.g., player rewards card insertion terminal) at the respective slot machine 102A, 102B), and/or slot machine maintenance data (e.g., from a sensor at the respective slot machine 102A, 102B such as a sensor associated with a specific peripheral device at the respective slot machine 102A, 102B) generated at the respective slot machine 102A, 102B. The first GMU and the second GMU can each be programmed to process the slot machine data generated on a per-spin basis at the respective slot machine 102A, 102B for transmission by the respective transmitter 108A, 108B according to the defined data transmission protocol (e.g., SAS v6) to be used to transmit such data.

As noted, the slot machine data on a per-spin basis is transmitted from the respective slot machine 102A, 102B to the remote server 104. In some embodiments, such as that illustrated at FIG. 1, system 100 can include one or more intermediate data transmission relays or repeaters between the respective slot machine 102A, 102B and the remote server 104. In some such embodiments, system 100 can include a first on-site casino computing device 110A and/or a second on-site casino computing device 110B. The first on-site casino computing device 110A can be located at the first casino (e.g., the first casino where the first slot machine 102A is located) and the second on-site casino computing device 110B can be located at the second, different casino (e.g., the second, different casino where the second slot machine 102B is located), and the first and second on-site casino computing devices 110A, 110B can be configured to convey data between the respective first and second slot machines 102A, 102B and the remote server 104. Accordingly, in operation of this embodiment of system 100, slot machine data on a per-spin basis generated at slot machine 102A can be transmitted from slot machine 102A to the first on-site casino computing device 110A, and this slot machine data on a per-spin basis can be transmitted from the first on-site casino computing device 110A to the remote server 104. Likewise, slot machine data on a per-spin basis generated at slot machine 102B can be transmitted from slot machine 102B to the second on-site casino computing device 110B, and this slot machine data on a per-spin basis can be transmitted from the second on-site casino computing device 110B to the remote server 104. The remote server 104 can then use this received per-spin slot machine data, for instance, by comparing this per-spin slot machine data to at least one predetermined threshold and, when this per-spin slot machine data satisfies the at least one predetermined threshold, the remote server 104 can generate a corresponding output (e.g., an output to the remote device 106).

As noted, in various embodiments, the slot machines 102A, 102B can be distinct, different slot machines, for instance at different locations. In some embodiments, the slot machines 102A, 102B can be at different locations, such as located at different casinos that are at different geographic locations. Accordingly, slot machine 102A can be a first slot machine at a first casino and slot machine 102B can be a second slot machine at a second casino that is remote from the first casino. In operation, remote server 104 can receive first slot machine data on a per-spin basis at the first slot machine 102A from the first slot machine 102A and receive second slot machine data on a per-spin basis at the second slot machine 102B from the second slot machine 102B. The remote server 104 can compare the first slot machine data to at least one predetermined threshold and compare the second slot machine data to at least one predetermined threshold. When the first slot machine data satisfies the at least one predetermined threshold, the remote server 104 can output a first notification to a remote device. And, when the second slot machine data satisfies the at least one predetermined threshold, the remote server 104 can output a first notification to the remote device. In some embodiments, the at least one predetermined threshold to which the remote server 104 compares the first slot machine data, from the first slot machine 102A at the first casino, can be the same predetermined threshold to which the remote server 104 compares the second slot machine data, from the second slot machine 102B at the second, different casino. In other embodiments, the at least one predetermined threshold to which the remote server 104 compares the first slot machine data, from the first slot machine 102A at the first casino, can be a different predetermined threshold to which the remote server 104 compares the second slot machine data, from the second slot machine 102B at the second, different casino.

In certain embodiments, the remote server 104 can compare the received first slot machine data on a per-spin basis at the first slot machine 102A to the second slot machine data on a per-spin basis at the second slot machine 102B. In instances where the first slot machine 102A and the second slot machine 102B are a same type of slot machine (e.g., offering a same type of game with the same game parameters) but located at different locations (e.g., located at different casinos), the comparison of the received first slot machine data on a per-spin basis at the first slot machine 102A to the second slot machine data on a per-spin basis at the second slot machine 102B can be helpful to discern differences in the first and second slot machine per-spin data potentially resulting from factors related to the different locations of the first and second slot machines 102A, 102B. For instance, if the received first slot machine data on a per-spin basis at the first slot machine 102A indicates a greater number of games played (e.g., over a defined time period, such as over a given period within a given day) than the received second slot machine data on a per-spin basis at the second slot machine 102B, then it can be discerned that the different location of the first slot machine 102A may be a contributing factor to the greater number of games played at the first slot machine 102A. This type of output flagging a locational contributing factor to a difference in per-spin slot machine data can be useful in determining any actions (e.g., moving the second slot machine 102B to a different location, at the second casino, that is similar to the location of the first slot machine at the first casino (e.g., moving the second slot machine 102B to be closer to a popular restaurant or entertainment venue at the second casino similar to that of the first slot machine 102A at the first casino); hosting a promotional event at the second casino similar to that hosted at the first casino at the defined time period; etc.) to be implemented at the second slot machine 102B to increase utilization of the second slot machine 102B to more closely match that of the first slot machine 102A.

The remote server 104 can be configured to receive the per-spin slot machine data from one or more slot machines 102A, 102B and determine one or more outputs corresponding to the received per-spin slot machine data. For example, remote server 104 can include a database 111 that stores a contact correspondence table. The contact correspondence table can include contact information for a plurality of remote devices and an association between these remote devices and one or more types of outputs. For instance, remote server 104 can receive a first type of per-spin slot machine data, such as one or more types of slot machine game data, and compare this first type of per-spin slot machine data to one or more predetermined thresholds (e.g., one or more predetermined thresholds pulled from database 111). When the first type of per-spin slot machine data satisfies one or more such predetermined thresholds, remote server 104 can use the contact correspondence table to determine that a notification is to be output to a first remote device based on that first remote device being associated in the contact correspondence table with the first type of per-spin slot machine data (e.g., upon satisfaction of one or more slot machine game data predetermined thresholds, remote server 104 is configured to use the contact correspondence table to determine that a notification is to be output to a first remote device based on that first remote device being associated in the contact correspondence table with satisfaction of those one or more slot machine game data predetermined thresholds). In another instance, remote server 104 can receive a second, different type of per-spin slot machine data, such as one or more types of slot machine maintenance data, and compare this second type of per-spin slot machine data to one or more predetermined thresholds. When the second type of per-spin slot machine data satisfies one or more such predetermined thresholds, remote server 104 can use the contact correspondence table to determine that a notification is to be output to a second, different remote device based on that second remote device being associated in the contact correspondence table with the second type of per-spin slot machine data (e.g., upon satisfaction of one or more slot machine maintenance data predetermined thresholds, remote server 104 is configured to use the contact correspondence table to determine that a notification is to be output to a second remote device based on that second remote device being associated in the contact correspondence table with satisfaction of those one or more slot machine maintenance data predetermined thresholds). As such, given that the transmission and use of per-spin slot machine data can include relatively large amounts of data for a given time period, use of the contact correspondence table to selectively output notifications to those remote devices suited for the particular type of issue embodied in the underlying per-spin data can provide network efficiencies and user satisfaction by allowing for tailored notifications to those better suited to address the particular type of issue embodied in the underlying per-spin data. Namely, a person associated with a first remote device may be better suited to receive and address slot machine game data-related notifications while another person associated with a second, different remote device may be better suited to receive and address slot machine maintenance data-related notifications.

Figure 2:
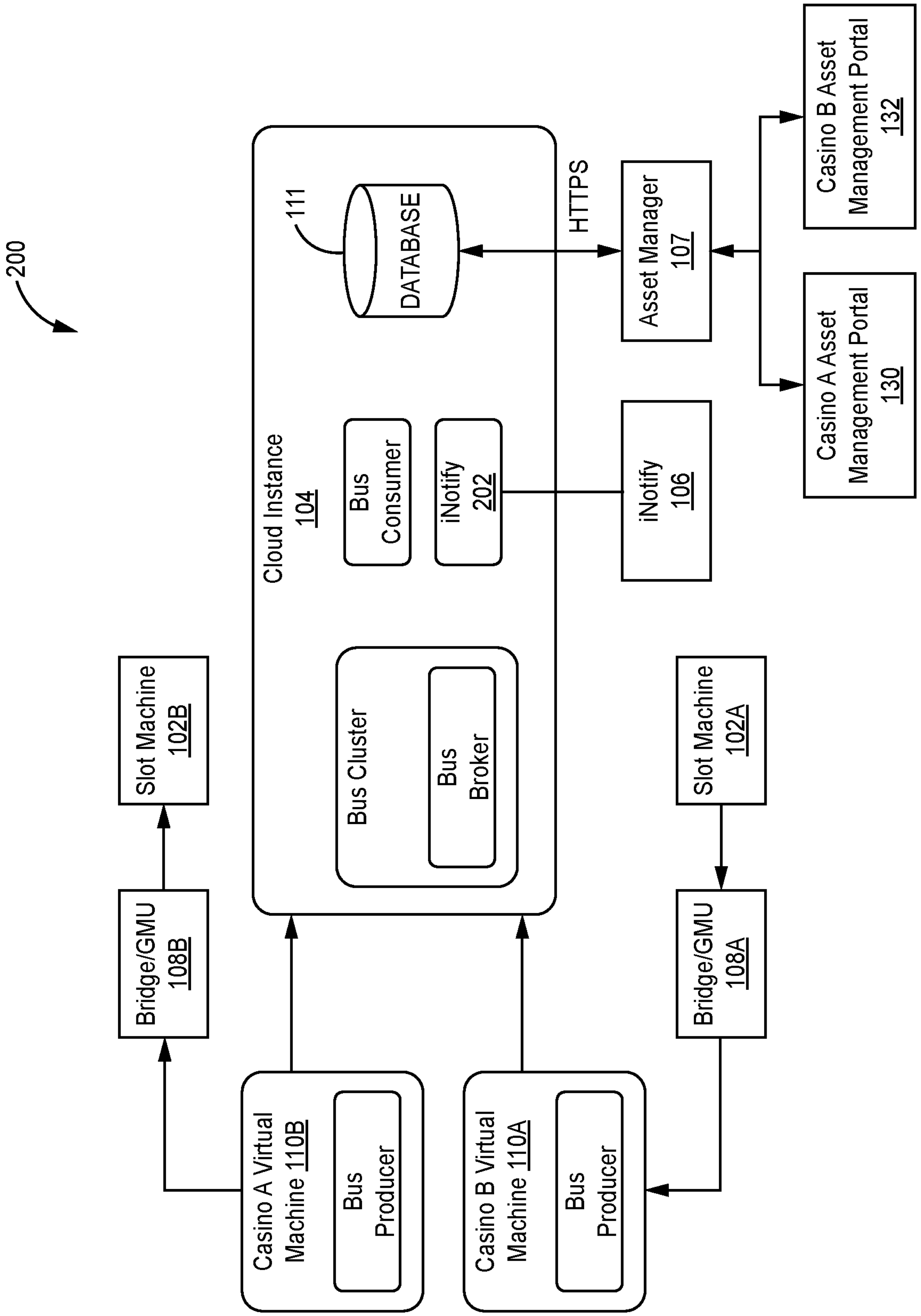
FIG. 2 is a conceptual block diagram illustrating another embodiment of a system for transmitting and accessing slot machine data on a per-spin basis with one or more output notification components, in accordance with some examples of this disclosure.

FIG. 2 illustrates another embodiment of a system 200 for transmitting and accessing slot machine data on a per-spin basis. The system 200 can be similar to, or the same as the system 100 described in reference to FIG. 1, except as otherwise noted here.

The remote server 104 of the embodiment of the system 200 can include a notification module 202. As noted, remote server 104 can be configured to use per-spin slot machine data and use this data to determine one or more corresponding outputs. To help with outputting the determined output, the notification module 202 can be, similar to the contact correspondence table described previously, configured to store contact information for a plurality of remote devices and an association between these remote devices and one or more types of outputs. With the inclusion of the notification module 202 serving a similar, or same, function as that described previously with respect to the contact correspondence table, remote device 106 be configured as a dedicated per-spin slot machine data access device. Accordingly, notification module 202 can be configured to output one or more notifications to one or more remote devices stored in association with the particular type of per-spin slot machine data prompting the one or more notifications while remote device 106 can server as a type of general management device that is configured to access database 111 on-demand to thereby access accumulated per-spin slot machine data stored at remote server 104 and any related indications derived from this accumulated per-spin slot machine data stored at remote server 104. As such, remote device 106 can be configured to execute locally stored computer-executable instructions to retrieve per-spin slot machine data from remote server 104 and display such per-spin slot machine data, and any related derived indications or metrics, at a user interface of remote device 106. Thus, system 200 can facilitate a dual function of (i) per-spin slot machine data triggered notifications output to targeted subsets of remote devices stored at remote server 104 in association with the underlying type of per-spin slot machine data triggering the notification, and (ii) on-demand per-spin slot machine data access via general management remote device 106.

Figure 3:
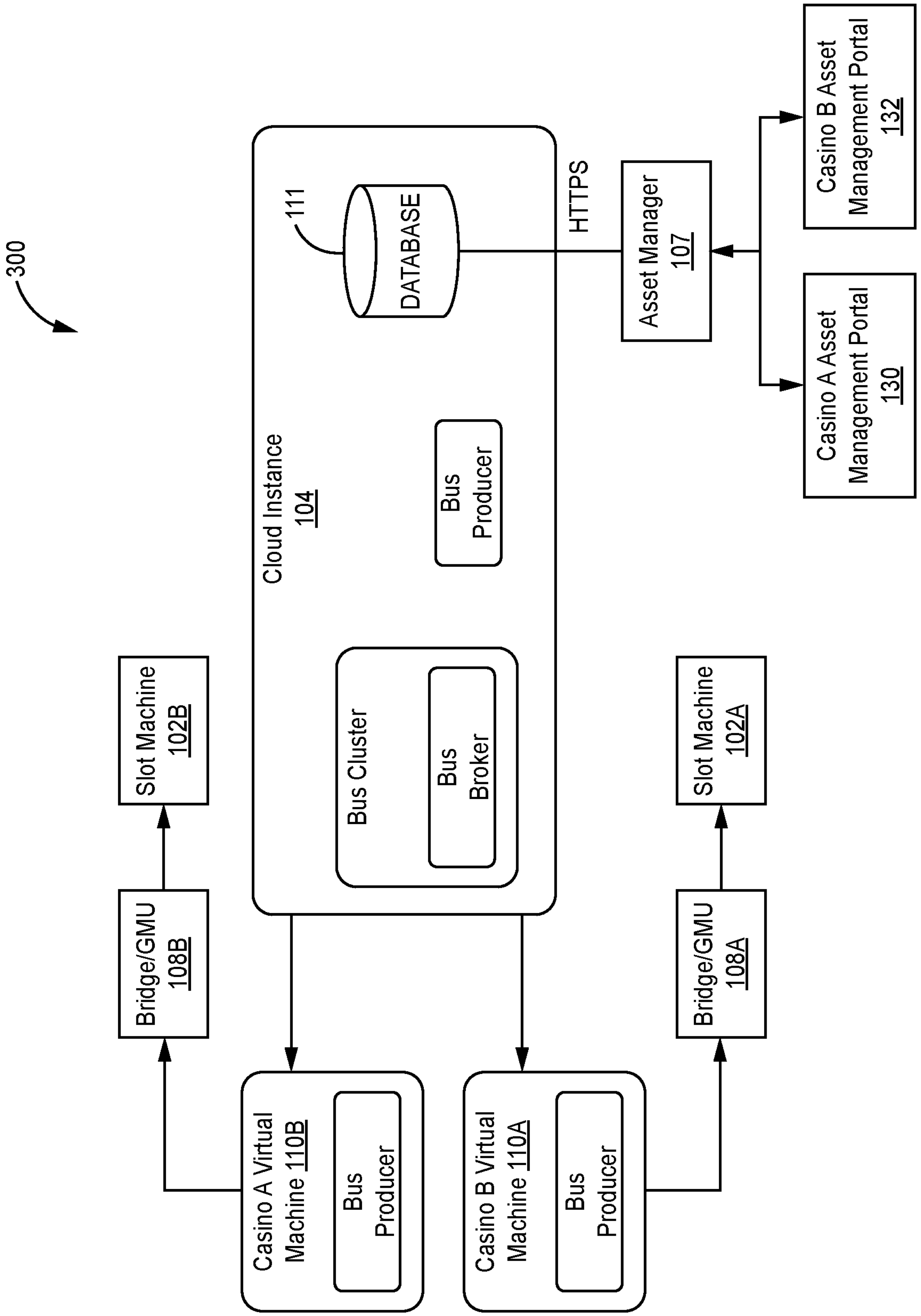
FIG. 3 is a conceptual block diagram illustrating an additional embodiment of a system for transmitting and accessing slot machine data on a per-spin basis with control command transmission to a slot machine, in accordance with some examples of this disclosure.

FIG. 3 illustrates another embodiment of a system 300 for transmitting and accessing slot machine data on a per-spin basis with control command transmission to one or more slot machines. The system 300 can be similar to, or the same as the systems 100, 200 as described in reference to FIGS. 1 and 2, except as otherwise noted here.

The system 300 can receive, at the remote server 104, the per-spin slot machine data from slot machine 102A and/or 102B as previously described. Based on this received per-spin slot machine data, the system 300 (e.g., via remote server 104) can determine a control command to be output to one or more slot machines 102A, 102B. Accordingly, the system 300 can be useful in leveraging per-spin slot machine data to determine, and, in further instances, output a corresponding slot machine control command.

In one example, the remote server 104 of the system 300 can transmit a control command to one or more slot machines 102A, 102B based on an input control command received at the remote server 104. For instance, remote server 104 can receive a first type of input control command from a remote device (e.g., the remote device 106 shown in FIG. 2). Remote server 104 can then output a control command to one or more slot machines 102A, 102B corresponding to the first type of input control command received from a remote device (e.g., the remote device 106 shown in FIG. 2). The first type of input control command received from the remote device, and thus the output control command to one or more slot machines 102A, 102B from the remote server 104, can be, for example, a command to cause one or more slot machines 102A, 102B to transition from an operable state to an inoperable state.

In another example, the remote server 104 of the system 300 can transmit a control command to one or more slot machines 102A, 102B based on per-spin slot machine data (e.g., per-spin slot machine maintenance data) received from one or more slot machines 102A, 102B at remote server 104. For instance, remote server 104 can first receive per-spin slot machine data from slot machine 102A and/or 102B. The remote server 104 can then compare this received per-spin slot machine data from slot machine 102A and/or 102B to one or more predetermined thresholds. When the per-spin slot machine data from slot machine 102A and/or 102B satisfies one or more predetermined thresholds, remote server 104 can transmit a control command to one or more slot machines 102A, 102B. As one specific such example, remote server 104 can first receive per-spin slot machine maintenance data from slot machine 102A and/or 102B, such as a slot machine identification corresponding to that slot machine and an indication of an inoperable game at that slot machine, malfunctioning peripheral device at that slot machine, or an abnormal temperature at that slot machine. Based on receipt of this per-spin slot machine maintenance data, remote server 104 can then determine a corresponding control command stored at remote server 104 in association with the type of received per-spin slot machine maintenance data. Remote server 104 can then transmit the control command to the slot machine from which the indication of an inoperable game at that slot machine, malfunctioning peripheral device at that slot machine, or an abnormal temperature at that slot machine was received. For instance, when remote server 104 receives per-spin slot machine maintenance data indicating an inoperable game at that slot machine, malfunctioning peripheral device at that slot machine, or an abnormal temperature at that slot machine, remote server 104 can determine, using the stored per-spin slot machine maintenance data-control command correspondence table, that a control command to cause the slot machine to transition from an operable state to an inoperable state. This can be useful, in some instances, for preventing an undesirable player experience at a particular slot machine currently experiencing a maintenance issue by preventing the slot machine from operating (e.g., via remotely changing the status of that slot machine to be an inoperable state).

Figure 4:
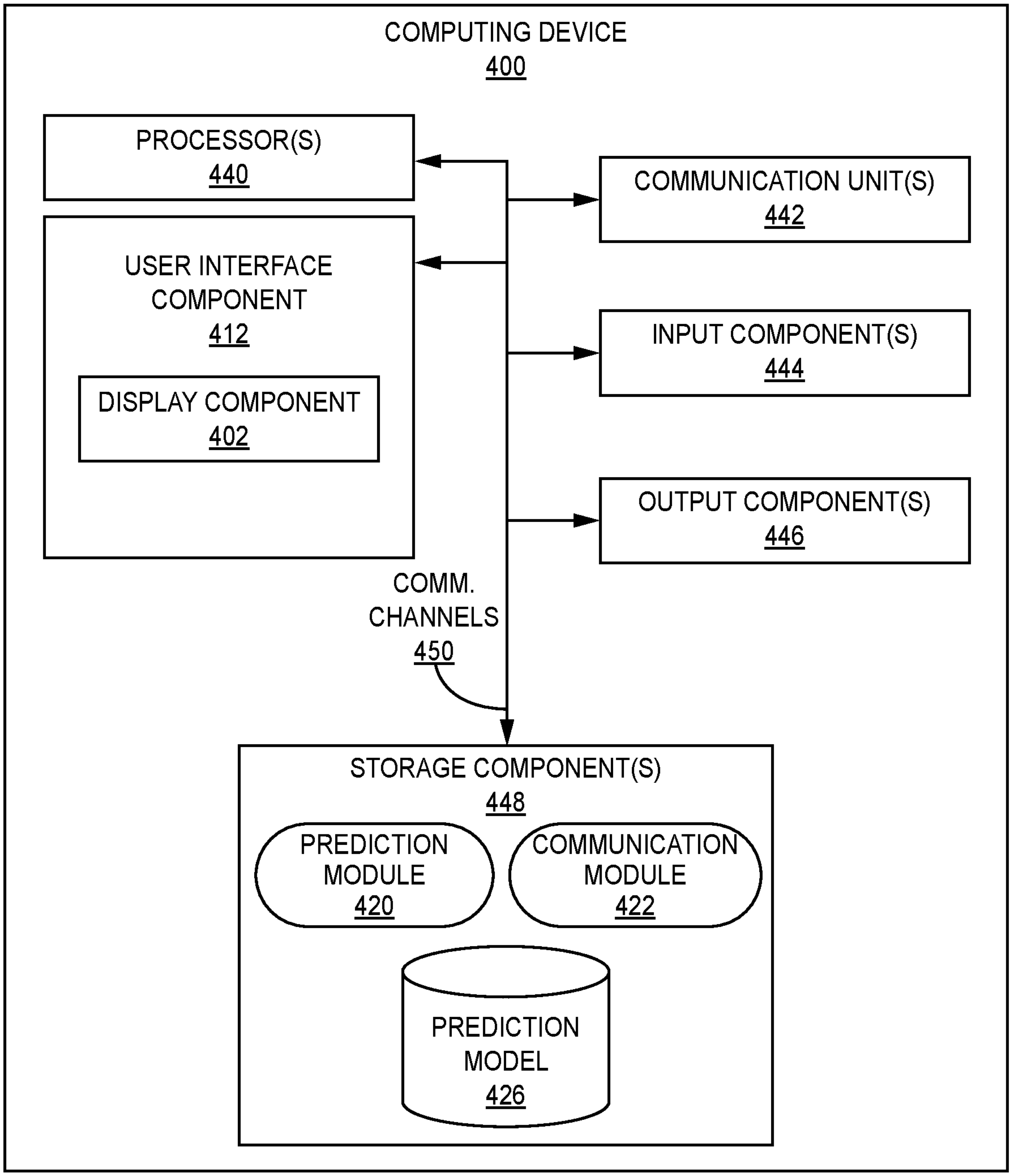
FIG. 4 is a conceptual block diagram illustrating an embodiment of a device for reception of slot machine data on a per-spin basis and output determination based on the slot machine data on a per-spin basis, in accordance with some examples of this disclosure.

FIG. 4 illustrates a block diagram of an embodiment of a device 400 configured for reception of slot machine data on a per-spin basis and output determination based on the slot machine data on a per-spin basis. The device 400 can be included as part of any of the systems 100, 200, 300 and, thus, can be configured to carry out functions similar to, or the same as, those described herein with respect to the systems 100, 200, 300. For example, in some embodiments, the device 400 can be the remote server described with respect to any one of the systems 100, 200, 300. FIG. 4 illustrates only one particular example of device 400, and many other examples of device 400 can be used in other instances and may include a subset of the components included in example device 400 or may include additional components not shown in FIG. 4.

As shown in the exemplary embodiment of FIG. 4, device 400 can include user interface component (UIC) 412, one or more programmable processors 440, one or more communication units 442, one or more input components 444, one or more output components 446, and one or more storage components 448. UIC 412 can include display component 402. Storage components 448 of computing device 410 can include prediction module 420, communication module 422, and prediction model 426. Storage components 448 can also include the contact correspondence table described previously herein.

One or more programmable processors 440 can implement functionality and/or execute instructions associated with device 400 to apply prediction model 426 to received slot machine data in order to determine a prediction, such as a maintenance issue likely to arise at one or more slot machines. That is, processors 440 may implement functionality and/or execute instructions associated with computing device 400 to receive various per-spin slot machine data from one or more slot machines (e.g., different slot machines located at different casinos) and apply prediction model 426 to that slot machine data (e.g., per-spin slot machine maintenance data) to predict whether a maintenance issue has or is likely to occur at the one or more slot machines. This can include, in some such examples, using the received per-spin slot machine maintenance data to diagnose and predict future failures by comparing the received per-spin slot machine maintenance data to a stored database of previous maintenance issues diagnosed from previous per-spin slot machine maintenance data. As one specific such example, where a stored database of previous maintenance issues diagnosed from previous per-spin slot machine maintenance data indicates that a temperature at the slot machine in excess of a threshold temperature resulted in operational failure of the slot machine in the past, this can be used to diagnose and predict future operational failure at another slot machine from which per-spin slot machine maintenance data is received and indicates a temperature at that slot machine in excess of the threshold temperature from the prior data.

Examples of processors 440 include application processors, display controllers, auxiliary processors, one or more sensor hubs, and any other hardware configure to function as a processor, a processing unit, or a processing device. Modules 420, 422, and 426 can be operable by processors 440 to perform various actions, operations, or functions of device 400. For example, processors 440 of device 400 can retrieve and execute instructions stored by storage components 448 that cause processors 440 to perform the operations described with respect to modules 420 and 422. The instructions, when executed by processors 240, can cause computing device 400 to apply prediction model 226 to received slot machine data in order to determine a prediction of a future slot machine maintenance issue.

In some examples, communication module 422 may execute locally (e.g., at processors 440) to provide functions associated with communicating with slot machines and other remote devices, such as described with respect to FIGS. 1-3. In some examples, communication module 422 may act as an interface to a remote server accessible to computing device 400. For example, communication module 422 may be an interface or application programming interface (API) to a remote data center that receives the per-spin slot machine data used by prediction module 420 to determine the prediction of a slot machine maintenance issue using past per-spin slot machine data.

One or more storage components 448 within device 400 may store information for processing during operation of device 400 (e.g., device 400 may store data accessed by modules 420 and 422 during execution at device 400). Storage components 448, in some examples, can also include one or more computer-readable storage media. Storage components 448 in some examples include one or more non-transitory computer-readable storage mediums. Storage components 448 may be configured to store larger amounts of information than typically stored by volatile memory. Storage components 448 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 448 may store program instructions and/or information (e.g., per-spin slot machine data) associated with modules 420 and 422, and prediction model 426. Storage components 448 may include a memory configured to store data or other information associated with modules 420 and 422, and prediction model 426.

Communication channels 450 can interconnect and couple each of the components 412, 440, 442, 444, 446, and 448 for inter-component communications (physically, communicatively, and/or operatively). In some examples, communication channels 250 may include a system bus, a network connection, an inter-process communication data structure, or any other method for communicating data.

One or more communication units 442 of device 400 may communicate with external devices, such as one or more slot machines and/or one or more other remote devices, via one or more wired and/or wireless networks by transmitting and/or receiving network signals on one or more networks. Examples of communication units 442 include a network interface card (e.g. such as an Ethernet card), an optical transceiver, a radio frequency transceiver, or any other type of device that can send and/or receive slot machine information. Other examples of communication units 442 may include short wave radios, cellular data radios, wireless network radios, as well as universal serial bus (USB) controllers.

One or more input components 444 of device 400 can receive input. Examples of input are tactile, audio, and video input. And, one or more output components 446 of device 400 may generate output in a selected modality. Examples of modalities may include a tactile notification, audible notification, visual notification, machine generated voice notification, or other modalities.

UIC 412 of device 400 can include display component 402. Display component 402 may be a screen at which information (e.g., a visual indication) is displayed by UIC 412.

While illustrated as an internal component of device 400, UIC 412 may also represent an external component that shares a data path with device 400 for transmitting and/or receiving input and output. For instance, in one example, UIC 412 represents a built-in component of device 400 located within and physically connected to device 400 (e.g., a screen on a computing device serving as device 400). In another example, UIC 412 represents an external component of device 400 located outside and physically separated from device 400 (e.g., a monitor, a projector, etc. that shares a wired and/or wireless data path with device 400).

In accordance with the techniques of this disclosure, communication module 422 can receive, from one or more slot machines, slot machine data that includes slot machine data on a per-spin basis at that particular one or more sot machines. In some such examples, the slot machine data on a per-spin basis includes one or more of slot machine game data, slot machine player data, and slot machine maintenance data.

Programmable processing circuitry, such as one or more processors 440, can be configured to execute a slot machine data analysis model stored at one or more storage component(s) 448. As one such example, programmable processing circuitry can be configured to compare the received per-spin slot machine data to at least one predetermined threshold, and, when the per-spin slot machine data satisfies the at least one predetermined threshold, the programmable processing circuitry can be configured to output a notification to a remote device. For instance, just as the received slot machine data can include slot machine data on a per-spin basis, the at least one predetermined threshold can include a predetermined threshold that relates to a slot machine metric on a per-spin basis.

In another such example, programmable processing circuitry can be configured to execute a slot machine data analysis model stored at one or more storage component(s) 448 in the form of prediction module 420 to apply prediction model 426 to per-spin slot machine maintenance data to predict a future slot machine maintenance issue for a particular slot machine, as described previously.

Prediction module 420 may utilize the received slot machine data to alter prediction model 426, either prior to or after the determination of the prediction of a slot machine maintenance issue. In other words, prediction module 420 may adjust prediction model 426 based at least in part on the received slot machine data. In adjusting the prediction model based at least in part on the slot machine data, prediction module 420 may analyze one or more of a number of currency bills currently held in the slot machine; an inoperable game at the slot machine; a type of malfunctioning peripheral device at the slot machine; a temperature at the slot machine; and a back-up battery event at the slot machine to determine an impact of the slot machine maintenance data. Prediction module 420 may then adjust one or more aspects of the prediction model based on the slot machine maintenance data impact.

For instance, prediction model 426 may be a series of weights applied to various pieces of slot machine data received by communication module 422 from one or more sot machines. After applying the weights, prediction module 420 may determine a sum of those values and compare the values to a slot machine data threshold. If this threshold is exceeded, then prediction module 420 may predict a slot machine maintenance issue. Conversely, if the threshold is not exceeded, then prediction module 420 may predict no slot machine maintenance issue for the time being.

In some examples, after determining the prediction of the slot machine maintenance issue, prediction module 420 may detect whether the slot machine maintenance issue actually occurred. Prediction module 420 may further adjust one or more aspects of prediction model 426 based on the prediction of the slot machine maintenance issue and whether the slot machine maintenance issue actually occurred. For instance, if prediction module 420 predicts a slot machine maintenance issue but no slot machine maintenance issue actually occurs, prediction module 420 may adjust one or more weights in prediction model 426 (e.g., decreasing the weights for a false positive) and/or adjust one or more thresholds in prediction model (e.g., increasing the thresholds for a false positive). Prediction module 420 may adjust one or more of the weights and thresholds in an opposite manner if prediction module fails to predict a supervision failure that actually occurs.

In some instances, prediction model 426 may be a complex model that includes multiple sub-models, such as a slot machine game data model, a slot machine player data model, and a slot machine maintenance data model. In applying prediction model 426, prediction module 420 may apply the slot machine game data model to the received slot machine game data on a per-spin basis, the slot machine player data model to the received slot machine player data on a per-spin basis, and the slot machine maintenance data model to the received slot machine maintenance data on a per-spin basis. Once one or more of these individual states are determined in some order, prediction module 420 may then apply the system model to the slot machine game data, slot machine player data, and slot machine maintenance data, as well as any pertinent per-spin slot machine data (e.g., per-spin slot machine maintenance data and/or past correct or incorrect slot machine maintenance issue predictions) that may adjust certain weights or thresholds, to determine a system state. Prediction module 420 may then, in some instances, apply the final model to the system state, as well as any critical parameters, to predict a slot machine maintenance issue.

Figure 5:
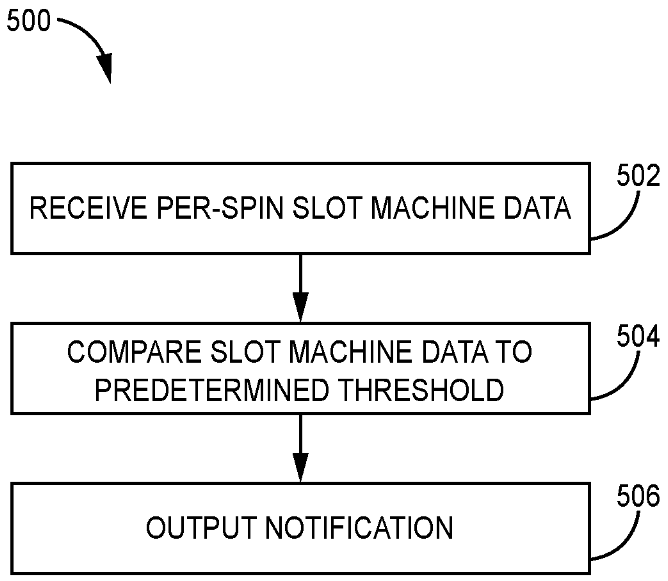
FIG. 5 is a flow diagram illustrating an embodiment of a method for receiving slot machine data on a per-spin basis and outputting a notification, in accordance with some examples of this disclosure.

FIG. 5 illustrates a flow diagram of an embodiment of a method 500 for receiving slot machine data on a per-spin basis and determining an output, such as a notification.

At step 505, the method 500 includes receiving, from at least one slot machine, slot machine data generated on a per-spin basis at the at least one slot machine. For example, the slot machine data received from at least one slot machine and generated on a per-spin basis at the at least one slot machine can include one or more of: slot machine game data, slot machine player data, and slot machine maintenance data. In one specific such example, the slot machine data received from at least one slot machine and generated on a per-spin basis at the at least one slot machine can include each of slot machine game data, slot machine player data, and slot machine maintenance data.

At step 510, the method 500 includes comparing the slot machine data to at least one predetermined threshold. For example, the at least one predetermined threshold can relate to a slot machine metric on a per-spin basis. As one specific such example, where the received slot machine data includes slot machine game data on a per-spin basis, the at least one predetermined threshold can be a predetermined slot machine game data per-spin threshold (e.g., where the received slot machine data includes a win/loss of a game resulting from a spin at the slot machine and/or a number of credits won/lost at the slot machine resulting from a spin at the slot machine, the at least one predetermined threshold can be a predetermined slot machine game data per-spin threshold associated with a predetermined win/loss of a game resulting from a spin at the slot machine and/or a predetermined number of credits won/lost at the slot machine resulting from a spin at the slot machine). As another specific such example, where the received slot machine data includes slot machine player data on a per-spin basis, the at least one predetermined threshold can be a predetermined slot machine player data per-spin threshold (e.g., where the received slot machine data includes a number of games won/lost by an identified player at the slot machine and/or a number of credits won/lost by an identified player at the slot machine, the at least one predetermined threshold can be a predetermined slot machine player data per-spin threshold associated with a predetermined number of games won/lost by an identified player at the slot machine and/or a predetermined number of credits won/lost by an identified player at the slot machine). And, as an additional specific such example, where the received slot machine data includes slot machine maintenance data on a per-spin basis, the at least one predetermined threshold can be a predetermined slot machine maintenance data per-spin threshold (e.g., where the received slot machine data includes a number of currency bills held in the specific slot machine, an inoperable game at the specific slot machine, a type of malfunctioning peripheral device at the specific slot machine, a temperature at the specific slot machine, and/or a back-up battery event at the specific slot machine, the at least one predetermined threshold can be a predetermined slot machine maintenance data per-spin threshold associated with a predetermined number of currency bills held in the specific slot machine, predetermined inoperable game at the specific slot machine, a predetermined type of malfunctioning peripheral device at the specific slot machine, a predetermined temperature at the specific slot machine, and/or a predetermined back-up battery event at the specific slot machine).

At step 515, the method 500 includes, when the slot machine data satisfies the at least one predetermined threshold, determining, and executing, an output. In one example, this can include determining and outputting a notification to a remote device. As one example of outputting a notification to a remote device, the step 515 can include using the type of per-spin slot machine data to determine which one or more of a plurality of remote devices stored in a database is associated with that type of per-spin slot machine data. For instance, when the received slot machine data includes slot machine game data, step 515 can include determining that the notification is to be output to a first remote device based on the first remote device being associated with slot machine game data in a contact correspondence table. And, when the received slot machine data includes slot machine maintenance data, step 515 can include determining that the notification is to be output to a second remote device based on the second remote device being associated with slot machine maintenance data in a contact correspondence table.

In a further embodiment where multiple slot machines are included at different casino locations, the method 500 can include receiving the slot machine data on a per-spin basis generated at the first slot machine at a first casino location and receiving, from a second slot machine at a second casino location that is remote from the first casino location, slot machine data on a per-spin basis generated at the second slot machine. The received slot machine data on a per-spin basis generated at the first slot machine can be compared to at least one predetermined threshold, and the received slot machine data on a per-spin basis generated at the second slot machine can be compared to at least one predetermined threshold. When the first per-spin slot machine data satisfies the at least one predetermined threshold, a first notification is output to a first remote device associated with that first per-spin slot machine data, and, when the second per-spin slot machine data satisfies the at least one predetermined threshold, a second notification is output to a second remote device associated with that second per-spin slot machine data.

Figure 6:
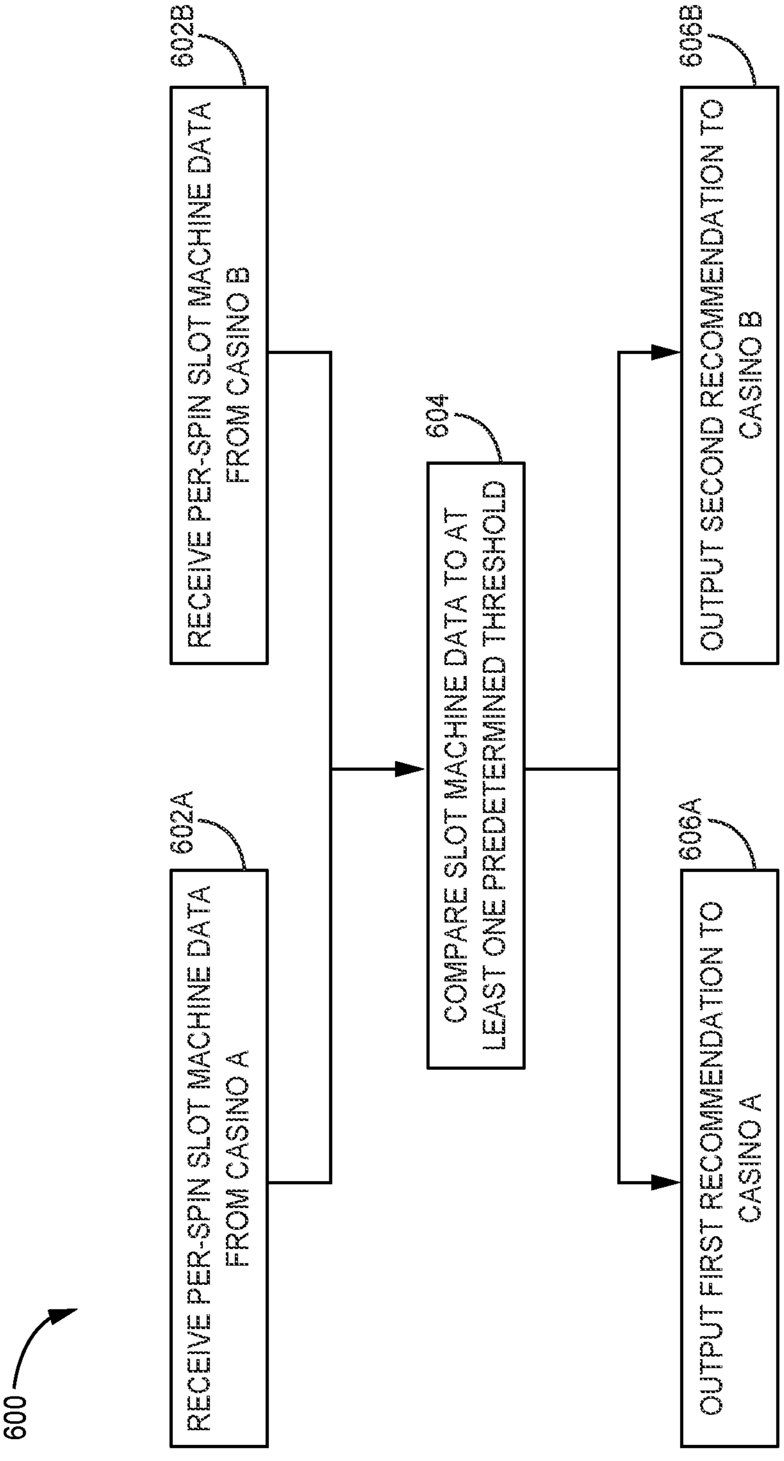
FIG. 6 is a flow diagram illustrating an embodiment of a method for using per-spin slot machine data from one or more casinos to provide one or more recommendations to the one or more casinos, in accordance with some examples of this disclosure.

FIG. 6 illustrates a flow diagram of an embodiment of a method 600 for using per-spin slot machine data from one or more casinos to provide one or more recommendations to the one or more casinos. As one example, the method 600 can be executed, in whole or in part, at the asset manager module 107, for instance, as described previously herein within the context of one or more of the systems for transmitting and accessing per-spin slot machine data. As described previously herein, the asset manager module 107 can be configured to use per-spin slot machine data from one or more slot machines at one or more casinos to derive one or more slot machine recommendations for one or more casinos and, as such, the asset manager module 107 can execute some or all of the steps of the method 600 to use per-spin slot machine data from one or more casinos to provide one or more recommendations to the one or more casinos.

At steps 602A, 602B, the method 600 includes receiving from one or more casinos slot machine data that includes data on a per-spin basis from at least one slot machine at the one or more casinos. More specifically, for the illustrated embodiment, the method 600 can include, at step 602A, receiving, from a first casino, first casino slot machine data, where the first casino slot machine data includes data on a per-spin basis from at least one slot machine at the first casino. And, for the illustrated embodiment, the method 600 can include, at step 602B, receiving, from a second casino, second casino slot machine data, where the second casino slot machine data includes data on a per-spin basis from at least one slot machine at the second casino. The second casino can be a different casino located at a different location than the first casino.

For instance, the at least one slot machine at the first casino can include a first slot machine at the first casino. And the first casino slot machine data received at step 602A can include first slot machine game data that includes a number of credits played for a spin at the first slot machine and a number of credits won/lost resulting from the spin at the first slot machine at the first casino. Similarly, for instance, the at least one slot machine at the second casino can include a second slot machine at the second casino that is different than the first slot machine at the first casino. And the second casino slot machine data received at step 602B can include second slot machine game data that includes a number of credits played for a spin at the second slot machine and a number of credits won/lost resulting from the spin at the second slot machine at the second casino.

Data on a per-spin basis received from the one or more slot machines at the one or more casinos at steps 602A, 602B can include one or more various types of per-spin data. For instance, at step 602A, the received first casino slot machine data can include data on a per-spin basis, from at least one slot machine at the first casino, including one or more of first slot machine game data, first slot machine first player data, and first slot machine maintenance data. In one such example, at step 602A, the received first casino slot machine data can include data on a per-spin basis, from at least one slot machine at the first casino, including each of: first slot machine game data, first slot machine first player data, and first slot machine maintenance data. Similarly, for instance, at step 602B, the received second casino slot machine data can include data on a per-spin basis, from at least one slot machine at the second casino, including one or more of: second slot machine game data, second slot machine first player data, and second slot machine maintenance data. In one such example, at step 602B, the received second casino slot machine data can include data on a per-spin basis, from at least one slot machine at the second casino, including each of: second slot machine game data, second slot machine first player data, and second slot machine maintenance data.

The per-spin slot machine game data that can be received, at step 602A, from the first slot machine can include one or more of: a time when a spin occurs at the first slot machine; a win/loss result of a first game resulting from a first spin at the first slot machine; a number of credits won/lost at the first slot machine resulting from the first spin at the first slot machine; and a number of games played at the first slot machine. Similarly, the per-spin slot machine game data that can be received, at step 602B, from the second slot machine can include one or more of: a time when a spin occurs at the second slot machine; a win/loss result of a second game resulting from a second spin at the second slot machine; a number of credits won/lost at the second slot machine resulting from the second spin at the second slot machine; and a number of games played at the second slot machine. The per-spin slot machine maintenance data that can be received, at step 602A, from the first slot machine can include one or more of: a number of currency bills currently held in the first slot machine; a total monetary value of currency bills currently held in the first slot machine; a type of malfunctioning peripheral device at the first slot machine; and a temperature at the first slot machine. Similarly, the per-spin slot machine maintenance data that can be received, at step 602B, from the second slot machine can include one or more of: a number of currency bills currently held in the second slot machine; a total monetary value of currency bills currently held in the second slot machine; a type of malfunctioning peripheral device at the second slot machine; and a temperature at the second slot machine. The per-spin slot machine player data that can be received, at step 602A, from the first slot machine can include one or more of: a player identification number received at the first slot machine; a number of games won/lost by a player at the first slot machine; a number of credits won/lost by a player at the first slot machine resulting from a spin at the first slot machine; a player transfer between cash and credits input at the first slot machine; and a total number of slot machine credits held by a player as input at the first slot machine. Similarly, the per-spin slot machine player data that can be received, at step 602B, from the second slot machine can include one or more of: a player identification number received at the second slot machine; a number of games won/lost by a player at the second slot machine; a number of credits won/lost by a player at the second slot machine resulting from a spin at the second slot machine; a player transfer between cash and credits input at the second slot machine; and a total number of slot machine credits held by a player as input at the second slot machine.

At step 604, the method 600 includes comparing the slot machine data, including the data on the per-spin basis from the one or more slot machines at the one or more casinos, to at least one predetermined threshold. As one example, in executing the method 600, the at least one predetermined threshold can relate to a slot machine metric on a per-spin basis. More specifically, for the illustrated embodiment, the method 600 can include, at step 604, comparing the first casino slot machine data, including the data on the per-spin basis from the at least one slot machine at the first casino, to at least one predetermined threshold, and comparing the second casino slot machine data, including the data on the per-spin basis from the at least one slot machine at the second casino, to at least one predetermined threshold. In some examples, the first casino slot machine data and the second casino slot machine data can be compared to the at least the same predetermined threshold, though other embodiments can include comparing the first casino slot machine data and the second casino slot machine data to different predetermined thresholds in addition or as an alternative to comparing the first casino slot machine data and the second casino slot machine data to at least the same predetermined threshold.

At steps 606A, 606B, the method 600 includes, based on comparing the slot machine data, including the data on the per-spin basis from the one or more slot machines at the one or more casinos, to at least one predetermined threshold, outputting a recommendation to one or more casinos. More specifically, for the illustrated embodiment, the method 600 can include, at step 606A, based at least on comparing the first casino slot machine data to the at least one predetermined threshold, outputting a first recommendation to the first casino. And, for the illustrated embodiment, the method 600 can include, at step 606B, based at least on comparing the second casino slot machine data to the at least one predetermined threshold, outputting a second recommendation to the second casino. The second recommendation output to the second casino can be different than the first recommendation output to the first casino.

The following description will address more particular examples of the method 600 described above.

In one particular such example of the method 600, the at least one predetermined threshold used for comparison at step 604 can include a predetermined risk/reward player disposition threshold. In such example, the first casino slot machine data received at step 602A can include first slot machine game data that includes a number of credits played for a spin at the first slot machine and a number of credits won/lost resulting from the spin at the first slot machine at the first casino, and the second casino slot machine data received at step 602B can include second slot machine game data that includes a number of credits played for a spin at the second slot machine and a number of credits won/lost resulting from the spin at the second slot machine at the second casino. Then, at step 604, comparing the first casino slot machine data, including the data on the per-spin basis from the at least one slot machine at the first casino, to at least one predetermined threshold can include comparing the number of credits played for the spin at the first slot machine and the number of credits won/lost resulting from the spin at the first slot machine at the first casino to the predetermined risk/reward player disposition threshold. Likewise, at step 604, comparing the second casino slot machine data, including the data on the per-spin basis from the at least one slot machine at the second casino, to at least one predetermined threshold can include comparing the number of credits played for the spin at the second slot machine and the number of credits won/lost resulting from the spin at the second slot machine at the second casino to the predetermined risk/reward player disposition threshold.

In this example, the predetermined risk/reward player disposition threshold can be used to determine and output a recommendation to one or more casinos to better align one or more slot machine configurations at such one or more casinos with the received substantially-real time per-spin slot machine data, such as slot machine game data that includes a number of credits played for a spin at one or more slot machines and a number of credits won/lost resulting from spin(s) at the one or more slot machines. For instance, where the at least one slot machine at the first casino includes a first slot machine at the first casino and the first casino slot machine data includes first slot machine per-spin game data, and the at least one slot machine at the second casino includes a second slot machine at the second casino and the second casino slot machine data includes second slot machine per-spin game data. As will be discussed further below, using the predetermined risk/reward player disposition threshold and based at least on comparing the first slot machine per-spin game data to the predetermined risk/reward player disposition threshold, can enable at step 606A outputting to the first casino the first recommendation that includes recommending a decrease to a risk/reward configuration of the first slot machine. And as also will be discussed further below, using the predetermined risk/reward player disposition threshold and based at least on comparing the second slot machine per-spin game data to the predetermined risk/reward player disposition threshold, can enable at step 606B outputting to the second casino the second recommendation that includes recommending a increase to a risk/reward configuration of the second slot machine.

In one further such example of the method 600, the predetermined risk/reward player disposition threshold used for comparison at step 604 can include a predetermined number of credits played per-spin threshold. Accordingly, in this particular further such example of the method 600, comparing the first casino slot machine data, including the data on the per-spin basis from the at least one slot machine at the first casino, to at least one predetermined at step 604 can include comparing the number of credits played for the spin at the first slot machine at the first casino to the predetermined number of credits played per-spin threshold. Then outputting the first recommendation to the first casino based at least on comparing the first casino slot machine data to the at least one predetermined threshold at step 606A can include outputting a first risk/reward configuration adjustment recommendation for the first slot machine at the first casino based at least on comparing the number of credits played for the spin at the first slot machine at the first casino to the predetermined number of credits played per-spin threshold. For instance, when the number of credits played for the spin at the first slot machine at the first casino is below the predetermined number of credits played per-spin threshold, the output first risk/reward configuration adjustment recommendation for the first slot machine at the first casino can include a recommendation to decrease a risk/reward configuration of the first slot machine (e.g., decrease the number of credits required to play a spin at the first slot machine and/or decrease the potential number of credits to be won on that spin at the first slot machine while increasing the odds at the first slot machine of a winning spin event). In another instance, when the number of credits played for the spin at the first slot machine at the first casino is above the predetermined number of credits played per-spin threshold, the output first risk/reward configuration adjustment recommendation for the first slot machine at the first casino can include a recommendation to increase a risk/reward configuration of the first slot machine (e.g., increase the number of credits required to play a spin at the first slot machine and/or increase the potential number of credits to be won on that spin at the first slot machine while decreasing the odds at the first slot machine of a winning spin event).

Likewise, in this particular further such example of the method 600 where the predetermined risk/reward player disposition threshold used for comparison at step 604 includes a predetermined number of credits played per-spin threshold, comparing the second casino slot machine data, including the data on the per-spin basis from the at least one slot machine at the second casino, to at least one predetermined at step 604 can include comparing the number of credits played for the spin at the second slot machine at the second casino to the predetermined number of credits played per-spin threshold. Then, outputting the second recommendation to the second casino based at least on comparing the second casino slot machine data to the at least one predetermined threshold at step 606B can include outputting a second risk/reward configuration adjustment recommendation for the second slot machine at the second casino based at least on comparing the number of credits played for the spin at the second slot machine at the second casino to the predetermined number of credits played per-spin threshold. For instance, when the number of credits played for the spin at the second slot machine at the second casino is above the predetermined number of credits played per-spin threshold, and the output second risk/reward configuration adjustment recommendation for the second slot machine at the second casino can include a recommendation to increase a risk/reward configuration of the second slot machine (e.g., decrease the number of credits required to play a spin at the second slot machine and/or decrease the potential number of credits to be won on that spin at the second slot machine while increasing the odds at the second slot machine of a winning spin event). In another instance, when the number of credits played for the spin at the second slot machine at the second casino is above the predetermined number of credits played per-spin threshold, the output second risk/reward configuration adjustment recommendation for the second slot machine at the second casino can include a recommendation to increase a risk/reward configuration of the second slot machine (e.g., increase the number of credits required to play a spin at the second slot machine and/or increase the potential number of credits to be won on that spin at the second slot machine while decreasing the odds at the second slot machine of a winning spin event).

In another particular example of the method 600, the method 600 can include an additional step of creating a casino standardized volatility scale using per-spin slot machine data from two or more slot machines located at one or more casinos. The created standardized volatility scale can represent a deviation in slot machine game win magnitude across the first plurality of slot machines at the first casino and/or a deviation in slot machine game win frequency across the first plurality of slot machines at the first casino.

For instance, when the method 600 includes the step of creating the casino standardized volatility scale, the at least one slot machine at the first casino can be a first plurality of slot machines at the first casino, and the first casino slot machine data can include data on the per-spin basis from each of the first plurality of slot machines at the first casino. As such, the first casino slot machine data on the per-spin basis from each of the first plurality of slot machines at the first casino can be used to create a first casino standardized volatility scale that represents at least one of (i) a deviation in slot machine game win magnitude across the first plurality of slot machines at the first casino and (ii) a deviation in slot machine game win frequency across the first plurality of slot machines at the first casino. Then with the creation of this first casino standardized volatility scale, based at least on comparing the first casino standardized volatility scale to the at least one predetermined threshold at step 604, the method 600 can include at step 606A outputting to the first casino the first recommendation that includes a recommendation to install at the first casino a particular type of slot machine that will, when installed at the first casino, adjust the first casino standardized volatility scale by a first degree of volatility.

In a further such instance when the method 600 includes the step of creating the casino standardized volatility scale, the at least one slot machine at the second casino can be a second plurality of slot machines at the second casino, and the second casino slot machine data can include data on the per-spin basis from each of the second plurality of slot machines at the second casino. As such, the second casino slot machine data on the per-spin basis from each of the second plurality of slot machines at the second casino can be used to create a second casino standardized volatility scale that represents at least one of (i) a deviation in slot machine game win magnitude across the second plurality of slot machines at the second casino and (ii) a deviation in slot machine game win frequency across the second plurality of slot machines at the second casino. Then with the creation of this second casino standardized volatility scale, based at least on comparing the second casino standardized volatility scale to the at least one predetermined threshold at step 604, the method 600 can include at step 606B outputting to the second casino the second recommendation that includes a recommendation to install at the second casino a particular type of slot machine that will, when installed at the second casino, adjust the second casino standardized volatility scale by a second degree of volatility (e.g., where the second degree of volatility is more or less than the first degree of volatility).

In many current casinos today, the slot machines present at such casinos can come from a number of different manufacturers. For example, the first plurality of slot machines at the first casino and the second plurality of slot machines at the second casino include slot machines from different manufacturers. Typically slot machines from different manufacturers can have different slot machine configurations and different standardized volatility scales for slot machines from the different manufacturers. Disclosed herein is a methodology for creating a cross-manufacturer slot machine standardized volatility, which can be leveraged to make recommendations as to changes to the configuration of select slot machines based at least in part on the cross-manufacturer slot machine standardized volatility (e.g., based at least in part on both the cross-manufacturer slot machine standardized volatility and the result of the comparison of slot machine per-spin game data to the predetermined risk/reward player disposition threshold).

To create the cross-manufacturer slot machine standardized volatility scale, the method 600 can use the received first casino slot machine data that includes data on the per-spin basis from each of the first plurality of slot machines at the first casino and the second casino slot machine data that includes data on the per-spin basis from each of the second plurality of slot machines at the second casino. The created cross-manufacturer slot machine standardized volatility scale can represent at least one of: (i) a deviation in slot machine game win magnitude across the first plurality of slot machines at the first casino and the second plurality of slot machines at the second casino that include slot machines from different manufacturers and (ii) a deviation in slot machine game win frequency across the first plurality of slot machines at the first casino and the second plurality of slot machines at the second casino that include slot machines from different manufacturers.

When created, this cross-manufacturer slot machine standardized volatility scale can be used for at least a portion of the comparison executed at step 604. For instance, the predetermined threshold used for the comparison at step 604 can include the cross-manufacturer slot machine standardized volatility scale to which the slot machine data (e.g., per-spin slot machine data) can be compared. Then, at step 606A the method 600 can include outputting the first recommendation to the first casino based at least in part on the cross-manufacturer slot machine standardized volatility scale, and at step 606B the method 600 can include outputting the second recommendation to the second casino based at least in part on the cross-manufacturer slot machine standardized volatility scale. For instance, based on the cross-manufacturer slot machine standardized volatility scale, the first recommendation output to the first casino at step 606A can include a first casino recommendation to replace a first type of slot machine at the first casino with a different type of slot machine that has a first different risk/reward game configuration, and, based on the cross-manufacturer slot machine standardized volatility scale, the second recommendation output to the second casino at step 606B can include a second casino recommendation to replace a second type of slot machine at the second casino with a different type of slot machine that has a second different risk/reward game configuration. In one particular such instance, the first casino recommendation can include a recommendation to replace a first type of slot machine made by a first manufacturer at the first casino with a different type of slot machine made by a second, different manufacturer and having a different risk/reward game configuration than the first type of slot machine made by the first manufacturer. Likewise, the second casino recommendation can include a recommendation to replace a first type of slot machine made by a first manufacturer at the second casino with a different type of slot machine made by a second, different manufacturer and having a different risk/reward game configuration than the first type of slot machine made by the first manufacturer.

Accordingly, when so included in the method 600, the creation of the cross-manufacturer slot machine standardized volatility scale can help to output one or more recommendations that are specific to a particular casino to provide guidance to that particular casino as to one or more changes to one or more slot machine game configurations and/or to one or more changes to swap one or more slot machines from manufacturer out for one or more slot machines from another, different manufacturer so as to better align the slot machine game configuration(s) and/or slot machine standardized volatility at that particular casino with the interests of the players frequenting that particular casino as discerned from the per-spin slot machine data (e.g., per-spin slot machine game data and/or per-spin slot machine player data).

In yet another particular such example of the method 600, the method 600 can include an additional step of transmitting one or more control commands to one or more specified slot machines. For example, after comparing the first casino slot machine data to the at least one predetermined threshold at step 604, the method 600 can include a step of transmitting a first control command from a remote server (e.g., from the asset manager module 107) to the first slot machine at the first casino. This transmitted first control command can include, for instance, a first command to cause the first slot machine to transition from an operable state to an inoperable state. In one such example, per-spin maintenance data can be received from the first slot machine and compared to a per-spin maintenance data predetermined threshold. As a result of this comparison (e.g., when the per-spin maintenance data can be received from the first slot machine matches the per-spin maintenance data predetermined threshold), the method 600 can include the step of transmitting the first control command from the remote server (e.g., from the asset manager module 107) to the first slot machine at the first casino. Similarly, as an additional example, after comparing the second casino slot machine data to the at least one predetermined threshold at step 604, the method 600 can include a step of transmitting a second control command from the remote server (e.g., from the asset manager module 107) to the second slot machine at the second casino. This transmitted second control command can include, for instance, a second command to cause the second slot machine to transition from an operable state to an inoperable state. In one such example, per-spin maintenance data can be received from the second slot machine and compared to a per-spin maintenance data predetermined threshold. As a result of this comparison (e.g., when the per-spin maintenance data can be received from the second slot machine matches the per-spin maintenance data predetermined threshold), the method 600 can include the step of transmitting the second control command from the remote server (e.g., from the asset manager module 107) to the second slot machine at the second casino.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method comprising the steps of:

receiving, from a first casino, first casino slot machine data, wherein the first casino slot machine data includes data on a per-spin basis from at least one slot machine at the first casino, wherein the at least one slot machine at the first casino is a first plurality of slot machines at the first casino, and wherein the first casino slot machine data includes data on the per-spin basis from each of the first plurality of slot machines at the first casino;

using the first casino slot machine data on the per-spin basis from each of the first plurality of slot machines at the first casino to create a first casino standardized volatility scale that represents at least one of: (i) a deviation in slot machine game win magnitude across the first plurality of slot machines at the first casino and (ii) a deviation in slot machine game win frequency across the first plurality of slot machines at the first casino;

receiving, from a second casino, second casino slot machine data, wherein the second casino slot machine data includes data on a per-spin basis from at least one slot machine at the second casino, the second casino being a different casino located at a different location than the first casino;

comparing the first casino slot machine data, including the data on the per-spin basis from the at least one slot machine at the first casino, to at least one predetermined threshold;

comparing the second casino slot machine data, including the data on the per-spin basis from the at least one slot machine at the second casino, to at least one predetermined threshold;

based at least on comparing the first casino slot machine data to the at least one predetermined threshold, outputting a first recommendation to the first casino, and wherein based at least on comparing the first casino standardized volatility scale to the at least one predetermined threshold, outputting to the first casino the first recommendation that includes a recommendation to install at the first casino a particular type of slot machine that will, when installed at the first casino, adjust the first casino standardized volatility scale by a first degree of volatility; and based at least on comparing the second casino slot machine data to the at least one predetermined threshold, outputting a second recommendation to the second casino.

2. The method of claim 1, wherein the at least one predetermined threshold relates to a slot machine metric on a per-spin basis.

3. The method of claim 1, wherein the at least one slot machine at the first casino comprises a first slot machine at the first casino, and wherein the first casino slot machine data comprises first slot machine game data that comprises a number of credits played for a spin at the first slot machine and a number of credits won/lost resulting from the spin at the first slot machine at the first casino, and wherein the at least one slot machine at the second casino comprises a second, different slot machine at the second casino, and wherein the second casino slot machine data comprises second slot machine game data that comprises a number of credits played for a spin at the second slot machine and a number of credits won/lost resulting from the spin at the second slot machine at the second casino.

4. The method of claim 3, wherein the at least one predetermined threshold comprises a predetermined risk/reward player disposition threshold, wherein comparing the first casino slot machine data, including the data on the per-spin basis from the at least one slot machine at the first casino, to at least one predetermined threshold comprises comparing the number of credits played for the spin at the first slot machine and the number of credits won/lost resulting from the spin at the first slot machine at the first casino to the predetermined risk/reward player disposition threshold, and wherein comparing the second casino slot machine data, including the data on the per-spin basis from the at least one slot machine at the second casino, to at least one predetermined threshold comprises comparing the number of credits played for the spin at the second slot machine and the number of credits won/lost resulting from the spin at the second slot machine at the second casino to the predetermined risk/reward player disposition threshold.

5. The method of claim 4, wherein the predetermined risk/reward player disposition threshold includes a predetermined number of credits played per-spin threshold, wherein comparing the first casino slot machine data, including the data on the per-spin basis from the at least one slot machine at the first casino, to at least one predetermined threshold comprises comparing the number of credits played for the spin at the first slot machine at the first casino to the predetermined number of credits played per-spin threshold, and wherein outputting the first recommendation to the first casino based at least on comparing the first casino slot machine data to the at least one predetermined threshold comprises outputting a first risk/reward configuration adjustment recommendation for the first slot machine at the first casino based at least on comparing the number of credits played for the spin at the first slot machine at the first casino to the predetermined number of credits played per-spin threshold.

6. The method of claim 5, wherein comparing the second casino slot machine data, including the data on the per-spin basis from the at least one slot machine at the second casino, to at least one predetermined threshold comprises comparing the number of credits played for the spin at the second slot machine at the second casino to the predetermined number of credits played per-spin threshold, and wherein outputting the second recommendation to the second casino based at least on comparing the second casino slot machine data to the at least one predetermined threshold comprises outputting a second risk/reward configuration adjustment recommendation for the second slot machine at the second casino based at least on comparing the number of credits played for the spin at the second slot machine at the second casino to the predetermined number of credits played per-spin threshold.

7. The method of claim 6, wherein the number of credits played for the spin at the first slot machine at the first casino is below the predetermined number of credits played per-spin threshold, and wherein the output first risk/reward configuration adjustment recommendation for the first slot machine at the first casino comprises a recommendation to decrease a risk/reward configuration of the first slot machine, and wherein the number of credits played for the spin at the second slot machine at the second casino is above the predetermined number of credits played per-spin threshold, and wherein the output second risk/reward configuration adjustment recommendation for the second slot machine at the second casino comprises a recommendation to increase a risk/reward configuration of the second slot machine.

8. The method of claim 1, wherein the at least one slot machine at the first casino comprises a first slot machine at the first casino, wherein the first casino slot machine data comprises first slot machine per-spin game data, wherein the at least one slot machine at the second casino comprises a second slot machine at the second casino, wherein the second casino slot machine data comprises second slot machine per-spin game data, wherein the at least one predetermined threshold comprises a predetermined risk/reward player disposition threshold, wherein based at least on comparing the first slot machine per-spin game data to the predetermined risk/reward player disposition threshold, outputting to the first casino the first recommendation that includes recommending a decrease to a risk/reward configuration of the first slot machine, and wherein based at least on comparing the second slot machine per-spin game data to the predetermined risk/reward player disposition threshold, outputting to the second casino the second recommendation that includes recommending an increase to a risk/reward configuration of the second slot machine.

9. The method of claim 1, wherein the at least one slot machine at the second casino is a second plurality of slot machines at the second casino, and wherein the second casino slot machine data includes data on the per-spin basis from each of the second plurality of slot machines at the second casino, and further comprising:

using the second casino slot machine data on the per-spin basis from each of the second plurality of slot machines at the second casino to create a second casino standardized volatility scale that represents at least one of: (i) a deviation in slot machine game win magnitude across the second plurality of slot machines at the second casino and (ii) a deviation in slot machine game win frequency across the second plurality of slot machines at the second casino, wherein based at least on comparing the second casino standardized volatility scale to the at least one predetermined threshold, outputting to the second casino the second recommendation that includes a recommendation to install at the second casino a particular type of slot machine that will, when installed at the second casino, adjust the second casino standardized volatility scale by a second degree of volatility.

10. The method of claim 9, wherein the first plurality of slot machines at the first casino and the second plurality of slot machines at the second casino include slot machines from different manufacturers.

11. The method of claim 10, further comprising:

using the first casino slot machine data that includes data on the per-spin basis from each of the first plurality of slot machines at the first casino and the second casino slot machine data that includes data on the per-spin basis from each of the second plurality of slot machines at the second casino to create a cross-manufacturer slot machine standardized volatility scale that represents at least one of: (i) a deviation in slot machine game win magnitude across the first plurality of slot machines at the first casino and the second plurality of slot machines at the second casino that include slot machines from different manufacturers and (ii) a deviation in slot machine game win frequency across the first plurality of slot machines at the first casino and the second plurality of slot machines at the second casino that include slot machines from different manufacturers.

12. The method of claim 11, wherein the predetermined threshold includes the cross-manufacturer slot machine standardized volatility scale, wherein the first recommendation is output to the first casino based at least in part on the cross-manufacturer slot machine standardized volatility scale, and wherein the second recommendation is output to the second casino based at least in part on the cross-manufacturer slot machine standardized volatility scale.

13. The method of claim 12, wherein, based on the cross-manufacturer slot machine standardized volatility scale, the first recommendation output to the first casino includes a first casino recommendation to replace a first type of slot machine at the first casino with a different type of slot machine that has a first different risk/reward game configuration, and wherein, based on the cross-manufacturer slot machine standardized volatility scale, the second recommendation output to the second casino includes a second casino recommendation to replace a second type of slot machine at the second casino with a different type of slot machine that has a second different risk/reward game configuration.

14. The method of claim 1, wherein the first casino slot machine data that includes data on a per-spin basis from at least one slot machine at the first casino comprises one or more of: first slot machine game data, first slot machine first player data, and first slot machine maintenance data, and wherein the second casino slot machine data that includes data on a per-spin basis from at least one slot machine at the second casino comprises one or more of: second slot machine game data, second slot machine first player data, and second slot machine maintenance data.

15. The method of claim 14, wherein the first casino slot machine data that includes data on a per-spin basis from at least one slot machine at the first casino comprises each of: first slot machine game data, first slot machine first player data, and first slot machine maintenance data, and wherein the second casino slot machine data that includes data on a per-spin basis from at least one slot machine at the second casino comprises each of: second slot machine game data, second slot machine first player data, and second slot machine maintenance data.

16. The method of claim 15, wherein the first slot machine game data comprises:

a time when a spin occurs at the first slot machine;

a win/loss result of a first game resulting from a first spin at the first slot machine;

a number of credits won/lost at the first slot machine resulting from the first spin at the first slot machine; and a number of games played at the first slot machine, and wherein the second slot machine game data comprises:

a time when a spin occurs at the second slot machine;

a win/loss result of a second game resulting from a second spin at the second slot machine;

a number of credits won/lost at the second slot machine resulting from the second spin at the second slot machine; and a number of games played at the second slot machine.

17. The method of claim 16, wherein the first slot machine maintenance data comprises one or more of:

a number of currency bills currently held in the first slot machine;

a total monetary value of currency bills currently held in the first slot machine;

a type of malfunctioning peripheral device at the first slot machine; and a temperature at the first slot machine, wherein the second slot machine maintenance data comprises:

a number of currency bills currently held in the second slot machine;

a total monetary value of currency bills currently held in the second slot machine;

a type of malfunctioning peripheral device at the second slot machine; and a temperature at the second slot machine.

18. The method of claim 1, further comprising:

after comparing the first casino slot machine data to the at least one predetermined threshold, transmitting a first control command from a remote server to the first slot machine at the first casino, wherein the first control command comprises a first command to cause the first slot machine to transition from an operable state to an inoperable state.

19. The method of claim 18, further comprising:

after comparing the second casino slot machine data to the at least one predetermined threshold, transmitting a second control command from the remote server to the second slot machine at the second casino, wherein the second control command comprises a second command to cause the second slot machine to transition from an operable state to an inoperable state.

* * * * *